(12) United States Patent
Klein, Jr.

(10) Patent No.: US 9,176,961 B2
(45) Date of Patent: *Nov. 3, 2015

(54) SYSTEM AND METHOD FOR GENERATING HOMOGENEOUS METADATA FROM PRE-EXISTING METADATA

(71) Applicant: Intel Corporation, Santa Clara, CA (US)

(72) Inventor: Eric N. Klein, Jr., Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/482,364

(22) Filed: Sep. 10, 2014

(65) Prior Publication Data

US 2015/0032765 A1  Jan. 29, 2015

Related U.S. Application Data

(63) Continuation of application No. 13/727,728, filed on Dec. 27, 2012, now Pat. No. 8,862,620, which is a continuation of application No. 11/397,301, filed on Mar. 29, 2006, now Pat. No. 8,346,789, which is a (Continued)

(51) Int. Cl.
*G06F 17/30* (2006.01)
*G06F 17/27* (2006.01)

(52) U.S. Cl.
CPC ...... *G06F 17/30053* (2013.01); *G06F 17/2705* (2013.01); *G06F 17/30038* (2013.01); *G06F 17/30218* (2013.01); *G06F 17/30772* (2013.01)

(58) Field of Classification Search
CPC .............. G06F 17/30772; G06F 17/30038; G06F 17/30053; G06F 17/2705; G06F 17/30218; G06F 17/30292; G06F 17/30489; G06F 17/30569; G06F 17/30398; G06F 17/30613; G01S 19/14; G06Q 30/0601; G06Q 30/0623; G06Q 30/08; G06Q 40/12

USPC ............. 707/755, 825, 771, 802, 803, 809, 707/E17.095, E17.102, E17.103, E17.001, 707/758, E17.009; 725/105, 135, 143, 133, 725/141, 136, 112, 37, 46
See application file for complete search history.

(56) References Cited

U.S. PATENT DOCUMENTS

| | | |
|---|---|---|
| 4,682,248 A | 7/1987 | Schwartz |
| 4,931,927 A | 6/1990 | Ishiwata et al. |

(Continued)

FOREIGN PATENT DOCUMENTS

| | | |
|---|---|---|
| WO | 2007041607 A2 | 4/2007 |
| WO | 2007078394 A2 | 7/2007 |

(Continued)

OTHER PUBLICATIONS

T Trippel, F Sasaki, D Gibbon—LREC, 2004—comp.nus.edu.sg—"Consistent Storage of Metadata in Inference Lexica: the MetaLex Approach"—pp. 1213-1216.*

(Continued)

*Primary Examiner* — Anh Ly
(74) *Attorney, Agent, or Firm* — Stoel Rives LLP

(57) ABSTRACT

A method according to one embodiment includes determining the presence of pre-existing metadata associated with at least one local media content file. The method of this embodiment may also include determining at least one data field contained within the pre-existing metadata and generating a homogeneous metadata file for the at least one local media content file by mapping data contained within the at least one data field of the pre-existing metadata into at least one defined data field of the homogeneous metadata file.

21 Claims, 18 Drawing Sheets

Related U.S. Application Data continuation-in-part of application No. 11/322,716, filed on Dec. 30, 2005, now abandoned, and a continuation-in-part of application No. 11/242,315, filed on Oct. 3, 2005, now Pat. No. 7,793,823.

(56) References Cited

U.S. PATENT DOCUMENTS

| | | | |
|---|---|---|---|
| 5,708,845 A * | 1/1998 | Wistendahl et al. | 715/202 |
| 5,819,160 A | 10/1998 | Foladare et al. | |
| 6,353,823 B1 | 3/2002 | Kumar | |
| 6,496,981 B1 * | 12/2002 | Wistendahl et al. | 725/112 |
| 6,523,046 B2 | 2/2003 | Liu et al. | |
| 6,549,922 B1 * | 4/2003 | Srivastava et al. | 707/E17.009 |
| 6,889,260 B1 | 5/2005 | Hughes | |
| 6,933,433 B1 | 8/2005 | Porteus et al. | |
| 6,954,543 B2 | 10/2005 | Svendsen et al. | |
| 6,987,221 B2 | 1/2006 | Platt | |
| 7,020,704 B1 | 3/2006 | Lipscomb et al. | |
| 7,110,982 B2 | 9/2006 | Feldman et al. | |
| 7,162,691 B1 | 1/2007 | Chatterjee et al. | |
| 7,171,018 B2 | 1/2007 | Rhoads et al. | |
| 7,451,157 B2 | 11/2008 | Kaler et al. | |
| 7,469,283 B2 * | 12/2008 | Eyal et al. | 709/223 |
| 7,546,288 B2 | 6/2009 | Springer et al. | |
| 7,580,932 B2 | 8/2009 | Plastina et al. | |
| 7,707,221 B1 | 4/2010 | Dunning et al. | |
| 7,793,823 B2 | 9/2010 | Klein, Jr. | |
| 8,005,724 B2 | 8/2011 | Dunning et al. | |
| 8,200,700 B2 | 6/2012 | Moore et al. | |
| 8,346,789 B2 | 1/2013 | Klein, Jr. | |
| 8,352,331 B2 | 1/2013 | Dunning et al. | |
| 2001/0025256 A1 | 9/2001 | Oliphant et al. | |
| 2002/0032019 A1 | 3/2002 | Marks et al. | |
| 2002/0049717 A1 | 4/2002 | Routtenberg et al. | |
| 2002/0082901 A1 | 6/2002 | Dunning et al. | |
| 2002/0120634 A1 | 8/2002 | Min et al. | |
| 2002/0120925 A1 * | 8/2002 | Logan | 725/9 |
| 2002/0157034 A1 * | 10/2002 | Sagar | 714/4 |
| 2003/0005138 A1 | 1/2003 | Giffin et al. | |
| 2003/0158614 A1 | 8/2003 | Friel et al. | |
| 2003/0200216 A1 | 10/2003 | Hayes et al. | |
| 2003/0229537 A1 | 12/2003 | Dunning et al. | |
| 2003/0233376 A1 | 12/2003 | Bussler et al. | |
| 2004/0107221 A1 * | 6/2004 | Trepess et al. | 707/104.1 |
| 2004/0111728 A1 | 6/2004 | Schwalm | |
| 2004/0230571 A1 | 11/2004 | Robertson | |
| 2004/0254659 A1 | 12/2004 | Bolas et al. | |
| 2005/0010589 A1 | 1/2005 | Novak et al. | |
| 2005/0015389 A1 * | 1/2005 | Novak et al. | 707/100 |
| 2005/0015712 A1 * | 1/2005 | Plastina et al. | 715/500.1 |
| 2005/0021470 A1 * | 1/2005 | Martin et al. | 705/51 |
| 2005/0055372 A1 | 3/2005 | Springer et al. | |
| 2005/0144166 A1 * | 6/2005 | Chapus et al. | 707/6 |
| 2005/0159104 A1 | 7/2005 | Valley et al. | |
| 2005/0177602 A1 | 8/2005 | Kaler et al. | |
| 2005/0182792 A1 | 8/2005 | Israel et al. | |
| 2005/0203931 A1 | 9/2005 | Pingree et al. | |
| 2005/0276570 A1 * | 12/2005 | Reed et al. | 386/46 |
| 2005/0289111 A1 | 12/2005 | Tribble et al. | |
| 2006/0004699 A1 * | 1/2006 | Lehikoinen et al. | 707/2 |
| 2006/0015521 A1 | 1/2006 | Howey et al. | |
| 2006/0041601 A1 | 2/2006 | Kim et al. | |
| 2006/0045287 A1 | 3/2006 | Abrams et al. | |
| 2006/0085343 A1 * | 4/2006 | Lisanke et al. | 705/50 |
| 2006/0089912 A1 * | 4/2006 | Spagna et al. | 705/51 |
| 2006/0143236 A1 | 6/2006 | Wu | |
| 2006/0161635 A1 | 7/2006 | Lamkin et al. | |
| 2006/0195438 A1 | 8/2006 | Galuten | |
| 2006/0212478 A1 | 9/2006 | Plastina et al. | |
| 2006/0242198 A1 * | 10/2006 | Jaffray et al. | 707/104.1 |
| 2006/0253207 A1 | 11/2006 | Jaffray et al. | |
| 2006/0253540 A1 | 11/2006 | Hughes | |
| 2007/0016599 A1 | 1/2007 | Plastina et al. | |
| 2007/0033229 A1 | 2/2007 | Fassett et al. | |
| 2007/0033292 A1 * | 2/2007 | Sull et al. | 709/238 |
| 2007/0048712 A1 | 3/2007 | Plastina et al. | |
| 2007/0073770 A1 | 3/2007 | Morris et al. | |
| 2007/0174147 A1 | 7/2007 | Klein, Jr. | |
| 2012/0265786 A1 | 10/2012 | Arrouye et al. | |
| 2013/0117309 A1 | 5/2013 | Klein, Jr. | |

FOREIGN PATENT DOCUMENTS

| | | | |
|---|---|---|---|
| WO | 2007078394 A3 | 8/2007 | |
| WO | 2007115078 A2 | 10/2007 | |
| WO | 2007041607 A3 | 5/2008 | |
| WO | 2007115078 A3 | 5/2008 | |

OTHER PUBLICATIONS

Randall Hauch, Alex Miller and Rob Cardwell—"Information intelligence: metadata for information discovery, access, and integration"—Proceeding SIGMOD '05 Proceedings of the 2005 ACM SIGMOD international conference on Management of data pp. 793-798.*

Internet article, "How Packets Work", Internet article Available at http://www.howstuffworks.com, retrieved on Oct. 17, 2009.

Final Office Action received for U.S. Appl. No. 11/242,315, mailed on Jun. 9, 2009, 10 pages.

Non-Final Office Action received for U.S. Appl. No. 11/242,315, mailed on Dec. 4, 2008, 9 pages.

Non-Final Office Action received for U.S. Appl. No. 11/242,315, mailed on Oct. 20, 2009, 12 pages.

Final Office Action received for U.S. Appl. No. 11/322,716, mailed on Apr. 27, 2010, 19 pages.

Final Office Action received for U.S. Appl. No. 11/322,716, mailed on Mar. 9, 2009, 18 pages.

Non-Final Office Action received for U.S. Appl. No. 11/322,716, mailed on Jun. 23, 2009, 19 pages.

Non-Final Office Action received for U.S. Appl. No. 11/322,716, mailed on Sep. 4, 2008, 17 pages.

Final Office Action received for U.S. Appl. No. 11/397,301, filed on Mar. 15, 2011, 37 pages.

Final Office Action received for U.S. Appl. No. 11/397,301, mailed on Nov. 26, 2008, 45 pages.

Non-Final Office Action received for U.S. Appl. No. 11/397,301, mailed on Apr. 24, 2012, 40 pages.

Non-Final Office Action received for U.S. Appl. No. 11/397,301, mailed on Aug. 4, 2010, 38 pages.

Non-Final Office Action received for U.S. Appl. No. 11/397,301, mailed on Mar. 3 2008, 32 pages.

Non-Final Office action received for U.S. Appl. No. 13/727,728, mailed on Jul. 9, 2013, 25 pages.

Notice of Allowance received for U.S. Appl. No. 13/727,728, mailed on Jun. 18, 2014, 14 pages.

Final Office Action received for U.S. Appl. No. 13/727/728, mailed on Dec. 19, 2013, 32 pages.

Big_Al, "Script that copies Itunes rating to the mp3 103 tag rating, or vice versa (for win)", Feb. 12, 2005, 6 pages. Available at; http://forums.ilounge.com/showthread.php?t=75687.

Randall Hauch, et al., "Information Intelligence: Metadata for Information Discovery, Access, and Integration", Proceeding SIGMOD '05 Proceedings of the 2005 ACM SIGMOD international conference on Management of data, 2005, pp. 793-798.

Jean-Pierre Kent, et al., "Some Thoughts About a Metadata Management System", SSDM 1997, Olympia, WA, Aug. 11-13, 1997, pp. 174-185.

Lagoze, et al., "What is a Digital Library Anymore Anyway?", Beyond Search and Access in the NSDL—D-Lib Magazine, Nov. 29, 2005, vol. 11, No. 11, 23 pages.

Edward Swierk, et al., "The Roma Personal Metadata Service", Mobile Networks and Applications, vol. 7, Kluwer Academic Publishers, The Netherlands, © 2002, pp. 407-418.

Thorsten Trippel, et al., "Consistent Storage of Metadata in Inference Lexica: the MetaLex Approach", 2004, 4 pages.

(56) References Cited

OTHER PUBLICATIONS

International Prelminary Report on Patentability and Written Opinion received in PCT Patent Application No. PCT/US2006/038705, mailed on Apr. 2, 2009, 7 pages.
International Search Report and Written Opinion received for PCT Patent Application No. PCT/US2006/038705, mailed on Feb. 12, 2008, 9 pages.
International Prelminary Report on Patentability and Written Opinion received for PCT Patent Application No. PCT/US2006/042141, mailed on Jul. 1, 2008, 9 pages.
International Search Report with Written Opinion received in PCT Patent Application No. PCT/US2006/042141, mailed on Jun. 29, 2007, 10 pages.
International Preliminary Report on Patentability and Written Opinion received for PCT Patent Application No. PCT/US2007/065470, mailed on Sep. 30, 2008, 6 pages.
International Search Report and Written Opinion received in PCT Patent Application No. PCT/US2007/065470, mailed on Mar. 6, 2008, 9 pages.

* cited by examiner

SYSTEM AND METHOD FOR GENERATING HOMOGENEOUS METADATA FROM PRE-EXISTING METADATA

RELATED APPLICATIONS

This application is a continuation of U.S. patent application Ser. No. 13/727,728, now U.S. Pat. No. 8,862,620, filed 27 Dec. 2012, and entitled "System and Method for Generating Homogeneous Metadata from Pre-Existing Metadata," which is a continuation of U.S. patent application Ser. No. 11/397,301, now U.S. Pat. No. 8,346,789, filed 3 Mar. 2006, and entitled "System and Method for Generating Homogeneous Metadata from Pre-Existing Metadata," which is a continuation-in-part of the following applications: U.S. patent application Ser. No. 11/242,315, now U.S. Pat. No. 7,793,823, filed 3 Oct. 2005, and entitled "System and Method for Supplementing a Radio Playlist with Local Content"; and U.S. patent application Ser. No. 11/322,716, now abandoned, filed 30 Dec. 2005, and entitled "System and Method for Updating a Playlist Based Upon Ratings". The aforementioned patent applications are hereby incorporated herein by reference in their entirety.

TECHNICAL FIELD

This application relates to generating homogeneous metadata from pre-existing metadata.

BACKGROUND

Media distribution systems (e.g., the Rhapsody™ and Rhapsody-to-Go™ services offered by RealNetworks, Inc. of Seattle, Wash.) distribute media content to a client electronic device (e.g., an MP3 player) from a media server. A media distribution system may distribute media content by allowing a user to download media data files and/or receive and process media data streams.

When media data files are traditionally downloaded to a user's client electronic device, each media data file downloaded is licensed for exclusive use on the user's client electronic device, such that the usage rights (associated with the downloaded media data file) are passed to the client electronic device at the time that the media data file is downloaded.

Often, a user of a first client electronic device may wish to share a media data file (e.g., a song) with a user of a second client electronic device. Unfortunately, as the media data files are licensed for exclusive use on a specific client electronic device, the media data file may not be directly transferred from the first client electronic device to the second client electronic device. Accordingly, the user of the second client electronic device would typically be required to obtain the media data file directly from the media distribution system.

SUMMARY

In an exemplary first implementation, a method includes determining the presence of pre-existing metadata associated with at least one local media content file. The method includes determining at least one data field contained within the pre-existing metadata and generating a homogeneous metadata file for the at least one local media content file by mapping data contained within the at least one data field of the pre-existing metadata into at least one defined data field of the homogeneous metadata file.

DETAILED DESCRIPTION OF EXEMPLARY EMBODIMENTS

Figure 1:
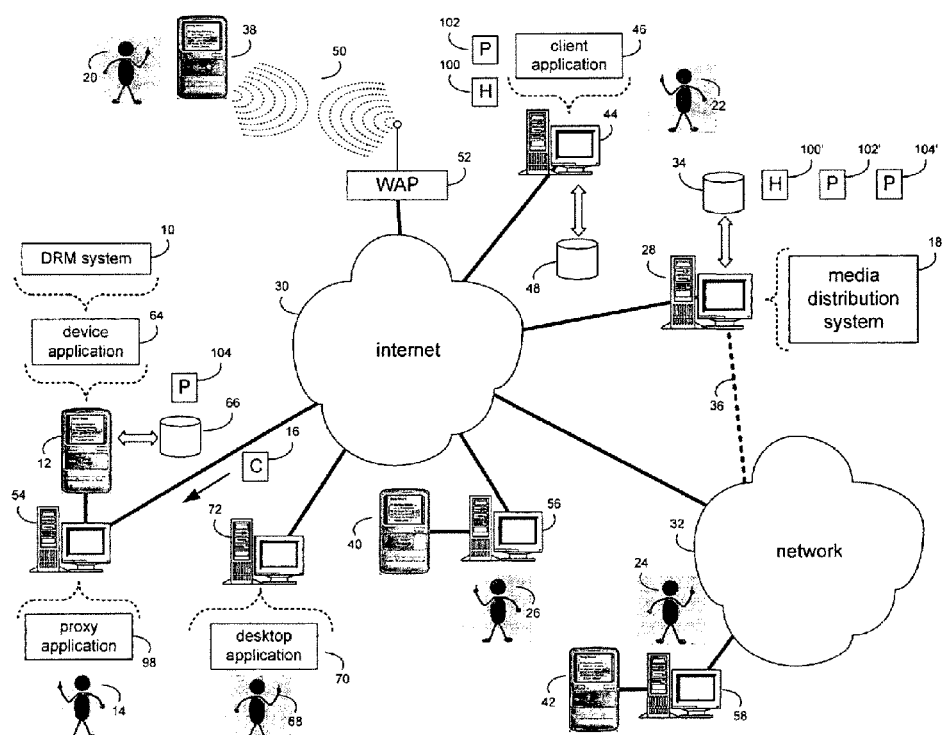
FIG. 1 is a diagrammatic view of a DRM process, a media distribution system, a client application, a proxy application, and a personal media device coupled to a distributed computing network.

System Overview:

Referring to FIG. 1, there is shown a DRM (i.e., digital rights management) process 10 that is resident on and executed by personal media device 12. As will be discussed below in greater detail, DRM process 10 allows a user (e.g., user 14) of personal media device 12 to manage media content resident on personal media device 12. Personal media device 12 typically receives media content 16 from media distribution system 18. Media content 16 may, for example, be digitally-encoded audio and/or video data that is compressed using known compression techniques. Examples of such compression techniques include MPEG-1, MPEG-2, MPEG-4, H.263, H.264, Advanced Audio Coding, and for example may include such other techniques promulgated by the international standards organization (ISO) (www.iso.org/iso/en/ISOOnline.frontpage) or such other organizations such as the Motion Picture Experts Group (MPEG) (www.chiariglione.org/mpeg/).

As will be discussed below in greater detail, examples of the format of the media content 16 received from media distribution system 18 may include: purchased downloads received from media distribution system 18 (i.e., media content licensed to e.g., user 14 for use in perpetuity); subscription downloads received from media distribution system 18 (i.e., media content licensed to e.g., user 14 for use while a valid subscription exists with media distribution system 18); and media content streamed from media distribution system 18, for example. Typically, when media content is streamed from e.g., computer 28 to personal media device 12, a copy of the media content is not permanently retained on personal media device 12. In addition to media distribution system 18, media content may be obtained from other sources, examples of which may include but are not limited to files ripped from music compact discs.

Examples of the types of media content 16 distributed by media distribution system 18 include: audio files (examples of which may include but are not limited to music files, audio news broadcasts, audio sports broadcasts, and audio recordings of books, for example); video files (examples of which may include but are not limited to video footage that does not include sound, for example); audio/video files (examples of which may include but are not limited to a/v news broadcasts, a/v sports broadcasts, feature-length movies and movie clips, music videos, and episodes of television shows, for example); and multimedia content (examples of which may include but are not limited to interactive presentations and slideshows, for example).

Media distribution system 18 typically provides media data streams and/or media data files to a plurality of users (e.g., users 14, 20, 22, 24, 26). Examples of such a media distribution system 18 include the Rhapsody™ service and Rhapsody-To-Go™ service offered by RealNetworks, Inc. of Seattle, Wash.

Media distribution system 18 is typically a server application that resides on and is executed by computer 28 (e.g., a server computer) that is connected to network 30 (e.g., the Internet). Computer 28 may be a web server running a network operating system, examples of which may include but are not limited to Microsoft Windows 2000 Server™, Novell Netware™, or Redhat Linux™.

Typically, computer 28 also executes a web server application, examples of which may include but are not limited to Microsoft IIS™, Novell Webserver™, or Apache Webserver™, that allows for HTTP (i.e., HyperText Transfer Protocol) access to computer 28 via network 30. Network 30 may be connected to one or more secondary networks (e.g., network 32), such as: a local area network; a wide area network; or an intranet, for example.

The instruction sets and subroutines of media distribution system 18, which are typically stored on a storage device 34 coupled to computer 28, are executed by one or more processors (not shown) and one or more memory architectures (not shown) incorporated into computer 28. Storage device 34 may include but are not limited to a hard disk drive, a tape drive, an optical drive, a RAID array, a random access memory (RAM), or a read-only memory (ROM).

Users 14, 20, 22, 24, 26 may access media distribution system 18 directly through network 30 or through secondary network 32. Further, computer 28 (i.e., the computer that executes media distribution system 18) may be connected to network 30 through secondary network 32, as illustrated with phantom link line 36.

Users 14, 20, 22, 24, 26 may access media distribution system 18 through various client electronic devices, examples of which may include, but are not limited to, personal media devices 12, 38, 40, 42, client computer 44, personal digital assistants (not shown), mobile or laptop computers (not shown), cellular telephones (not shown), televisions (not shown), cable boxes (not shown), internet radios (not shown), or dedicated network devices (not shown), for example.

The various client electronic devices may be directly or indirectly coupled to network 30 (or network 32). For example, client computer 44 is shown directly coupled to network 30 via a hardwired network connection. Further, client computer 44 may execute a client application 46 (examples of which may include but are not limited to Microsoft Internet Explorer™ available from Microsoft, Inc., of Redmond, Wash., Netscape Navigator™, Rhapsody™ client & RealPlayer™ client available from RealNetworks, Inc. of Seattle, Wash., or a specialized interface) that allows e.g., user 22 to access and configure media distribution system 18 via network 30 (or network 32). Client computer 44 may run an operating system, examples of which may include but are not limited to Microsoft Windows™, or Redhat Linux™.

The instruction sets and subroutines of client application 46, which are typically stored on a storage device 48 coupled to client computer 44, are executed by one or more processors (not shown) and one or more memory architectures (not shown) incorporated into client computer 44. Storage device 48 may include but are not limited to a hard disk drive, a tape drive, an optical drive, a RAID array, a random access memory (RAM), or a read-only memory (ROM).

As discussed above, the various client electronic devices may be indirectly coupled to network 30 (or network 32). For example, personal media device 38 is shown wireless coupled to network 30 via a wireless communication channel 50 established between personal media device 38 and wireless access point (i.e., WAP) 52, which is shown directly coupled to network 30. WAP 52 may be, for example, an IEEE 802.11a, 802.11b, 802.11g, Wi-Fi, and/or Bluetooth device that is capable of establishing the secure communication channel 50 between personal media device 38 and WAP 52. As is known in the art, all of the IEEE 802.11x specifications use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

In addition to being wirelessly coupled to network 30 (or network 32), personal media devices may be coupled to network 30 (or network 32) via a proxy computer (e.g., proxy computer 54 for personal media device 12, proxy computer 56 for personal media device 40, and proxy computer 58 for personal media device 42, for example).

Figure 2:
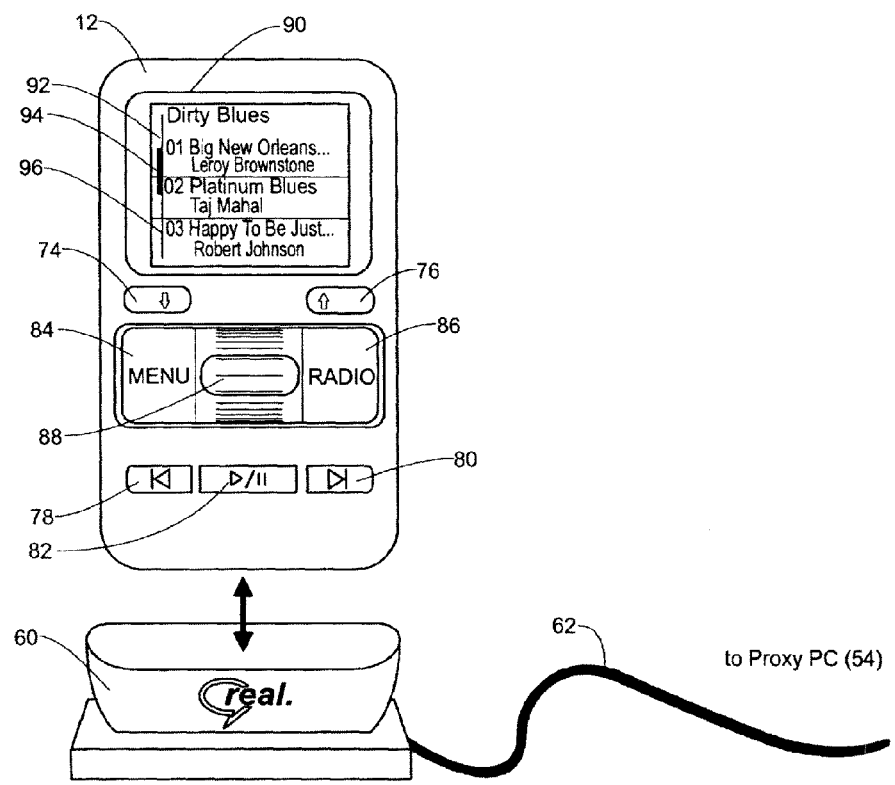
FIG. 2 is an isometric view of the personal media device of FIG. 1.

Personal Media Device:

For example and referring also to FIG. 2, personal media device 12 may be connected to proxy computer 54 via a docking cradle 60. Typically, personal media device 12 includes a bus interface (to be discussed below in greater detail) that couples personal media device 12 to docking cradle 60. Docking cradle 60 may be coupled (with cable 62) to e.g., a universal serial bus (i.e., USB) port, a serial port, or an IEEE 1394 (i.e., FireWire) port included within proxy computer 54. For example, the bus interface included within personal media device 12 may be a USB interface, and docking cradle 60 may function as a USB hub (i.e., a plug-and-play interface that allows for "hot" coupling and uncoupling of personal media device 12 and docking cradle 60).

Proxy computer 54 may function as an Internet gateway for personal media device 12. Accordingly, personal media device 12 may use proxy computer 54 to access media distribution system 18 via network 30 (and network 32) and obtain media content 16. Specifically, upon receiving a request for media distribution system 18 from personal media device 12, proxy computer 54 (acting as an Internet client on behalf of personal media device 12), may request the appropriate web page/service from computer 28 (i.e., the computer that executes media distribution system 18). When the requested web page/service is returned to proxy computer 54, proxy computer 54 relates the returned web page/service to the original request (placed by personal media device 12) and forwards the web page/service to personal media device 12. Accordingly, proxy computer 54 may function as a conduit for coupling personal media device 12 to computer 28 and, therefore, media distribution system 18.

Further, personal media device 12 may execute a device application 64 (examples of which may include but are not limited to Rhapsody™ client, RealPlayer™ client, or a specialized interface). Personal media device 12 may run an operating system, examples of which may include but are not limited to Microsoft Windows CE™, Redhat Linux™, Palm OS™, or a device-specific (i.e., custom) operating system.

DRM process 10 is typically a component of device application 64 (examples of which may include but are not limited to an embedded feature of device application 64, a software plug-in for device application 64, or a stand-alone application called from within and controlled by device application 64). The instruction sets and subroutines of device application 64 and DRM process 10, which are typically stored on a storage device 66 coupled to personal media device 12, are executed by one or more processors (not shown) and one or more memory architectures (not shown) incorporated into personal media device 12. Storage device 66 may be, for example, a hard disk drive, an optical drive, a random access memory (RAM), a read-only memory (ROM), a CF (i.e., compact flash) card, an SD (i.e., secure digital) card, a SmartMedia card, a Memory Stick, and a MultiMedia card, for example.

An administrator 68 typically accesses and administers media distribution system 18 through a desktop application 70 (examples of which may include but are not limited to Microsoft Internet Explorer™, Netscape Navigator™, or a specialized interface) running on an administrative computer 72 that is also connected to network 30 (or network 32).

The instruction sets and subroutines of desktop application 70, which are typically stored on a storage device (not shown) coupled to administrative computer 72, are executed by one or more processors (not shown) and one or more memory architectures (not shown) incorporated into administrative computer 72. The storage device (not shown) coupled to administrative computer 72 may include but are not limited to a hard disk drive, a tape drive, an optical drive, a RAID array, a random access memory (RAM), or a read-only memory (ROM).

Figure 3:
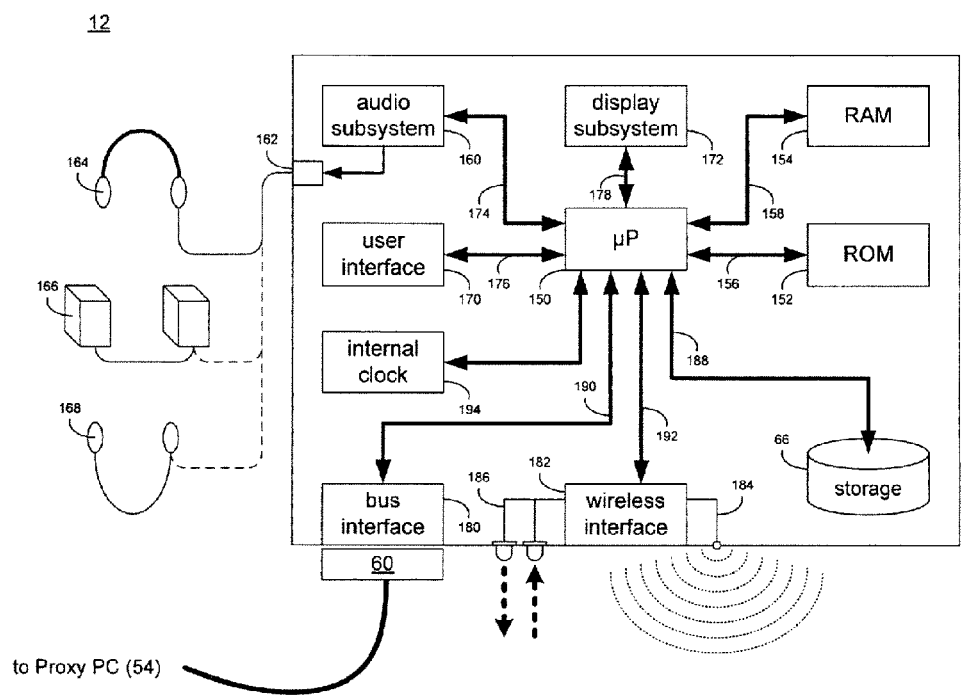
FIG. 3 is a diagrammatic view of the personal media device of FIG. 1.

Referring also to FIG. 3, a diagrammatic view of personal media device 12 is shown. Personal media device 12 typically includes microprocessor 150 (e.g., an ARM™ microprocessor produced by Intel Corporation of Santa Clara, Calif.), non-volatile memory (e.g., read-only memory 152), and volatile memory (e.g., random access memory 154); each of which may be interconnected via one or more data/system buses 156, 158. Personal media device 12 may also include an audio subsystem 160 for providing e.g., an analog audio signal to an audio jack 162 for removable engaging e.g., a headphone assembly 164, a remote speaker assembly 166, or an ear bud assembly 168, for example. Alternatively, personal media device 12 may be configured to include one or more internal audio speakers (not shown).

Personal media device 12 may also include a user interface 170 and a display subsystem 172. User interface 170 may receive data signals from various input devices included within personal media device 12, examples of which may include (but are not limited to): rating switches 74, 76; backward skip switch 78; forward skip switch 80; play/pause switch 82; menu switch 84; radio switch 86; and slider assembly 88, for example. Display subsystem 172 may provide display signals to display panel 90 included within personal media device 12. Display panel 90 may be an active matrix liquid crystal display panel, a passive matrix liquid crystal display panel, or a light emitting diode display panel, for example.

Audio subsystem 160, user interface 170, and display subsystem 172 may each be coupled with microprocessor 150 via one or more data/system buses 174, 176, 178 (respectively).

During use of personal media device 12, display panel 90 may be configured to display e.g., the title and artist of various pieces of media content 92, 94, 96 stored within personal media device 12. Slider assembly 88 may be used to scroll upward or downward through the list of media content stored within personal media device 12. When the desired piece of media content is highlighted (e.g., "Phantom Blues" by "Taj Mahal"), user 14 may select the media content for rendering using play/pause switch 82. User 14 may skip forward to the next piece of media content (e.g., "Happy To Be Just . . . " by "Robert Johnson") using forward skip switch 80; or skip backward to the previous piece of media content (e.g., "Big New Orleans . . . " by "Leroy Brownstone") using backward skip switch 78. Additionally, user 14 may rate the media content as they listen to it by using rating switches 74, 76.

As discussed above, personal media device 12 may include a bus interface 180 for interfacing with e.g., proxy computer 54 via docking cradle 60. Additionally and as discussed above, personal media device 12 may be wireless coupled to network 30 (and/or other personal media devices) via e.g., a wireless communication channel 50 established between personal media device 12 and e.g., WAP 52. Accordingly, personal media device 12 may include a wireless interface 182 for wirelessly-coupling personal media device 12 to network 30 (or network 32) and/or other personal media devices. Wireless interface 182 may be coupled to an antenna assembly 184 for RF communication to e.g., WAP 52, and/or an IR (i.e., infrared) communication assembly 186 for infrared communication with e.g., a second personal media device (such as personal media device 40). Further and as discussed above, personal media device 12 may include a storage device 66 for storing the instruction sets and subroutines of device application 64 and DRM process 10. Additionally, storage device 66 may be used to store media data files downloaded from media distribution system 18 and to temporarily store media data streams (or portions thereof) streamed from media distribution system 18.

Storage device 66, bus interface 180, and wireless interface 182 may each be coupled with microprocessor 150 via one or more data/system buses 188, 190, 192 (respectively).

As discussed above, media distribution system 18 distributes media content to users 14, 20, 22, 24, 26, such that the media content distributed may be in the form of media data streams and/or media data files.

Accordingly, media distribution system 18 may be configured to only allow users to download media data files. For example, user 14 may be allowed to download, from media distribution system 18, media data files (i.e., examples of which may include but are not limited to audio files encoded and compressed using an MP3 encoder or an Advanced Audio Coding (AAC) encoder, or digital video encoded files), such that copies of the media data file are transferred from computer 28 to personal media device 12 (being stored on storage device 66).

Alternatively, media distribution system 18 may be configured to only allow users to receive and process media data streams of media data files. For example, user 22 may be allowed to receive and process (on client computer 44) media data streams received from media distribution system 18. As discussed above, when media content is streamed from e.g., computer 28 to client computer 44, a copy of the media data file is not permanently retained on client computer 44.

Further, media distribution system 18 may be configured to allow users to receive and process media data streams and download media data files. Examples of such a media distribution system include the Rhapsody™ and Rhapsody-to-Go™ services offered by RealNetworks, Inc. of Seattle, Wash. Accordingly, user 14 may be allowed to download digital encoded media data files and receive and process media data streams from media distribution system 18. Therefore, copies of media data files may be transferred from computer 28 to personal media device 12 (i.e., the received media data files being stored on storage device 66); and streams of media data files may be received from computer 28 by personal media device 12 (i.e., with portions of the received stream temporarily being stored on storage device 66). Additionally, user 22 may be allowed to download media data files and receive and process media data streams from media distribution system 18. Therefore, copies of media data files may be transferred from computer 28 to client computer 44 (i.e., the received media data files being stored on storage device 48); and streams of media data files may be received from computer 28 by client computer 44 (i.e., with portions of the received streams temporarily being stored on storage device 48).

Typically, in order for a device to receive and process a media data stream from e.g., computer 28, the device must have an active connection to computer 28 and, therefore, media distribution system 18. Accordingly, personal media device 38 (i.e., actively connected to computer 28 via wireless channel 50), and client computer 44 (i.e., actively connected to computer 28 via a hardwired network connection) may receive and process media data streams from e.g., computer 28.

As discussed above, proxy computers 54, 56, 58 may function as a conduit for coupling personal media devices 12, 40, 42 (respectively) to computer 28 and, therefore, media distribution system 18. Accordingly, when personal media devices 12, 40, 42 are coupled to proxy computers 54, 56, 58 (respectively) via e.g., docking cradle 60, personal media devices 12, 40, 42 are actively connected to computer 28 and, therefore, may receive and process media data streams provided by computer 28.

User Interfaces:

As discussed above, media distribution system 18 may be accessed using various types of client electronic devices, which include but are not limited to personal media devices 12, 38, 40, 42, client computer 44, personal digital assistants (not shown), cellular telephones (not shown), televisions (not shown), cable boxes (not shown), internet radios (not shown), or dedicated network devices (not shown), for example. Typically, the type of interface used by the user (when configuring media distribution system 18 for a particular client electronic device) will vary depending on the type of client electronic device to which the media content is being streamed/downloaded.

For example, as the embodiment shown (in FIG. 2) of personal media device 12 does not include a keyboard and the display panel 90 of personal media device 12 is compact, media distribution system 18 may be configured for personal media device 12 via proxy application 98 executed on proxy computer 54.

The instruction sets and subroutines of proxy application 98, which are typically stored on a storage device (not shown) coupled to proxy computer 54, are executed by one or more processors (not shown) and one or more memory architectures (not shown) incorporated into proxy computer 54. The storage device (not shown) coupled to proxy computer 54 may include but are not limited to a hard disk drive, a tape drive, an optical drive, a RAID array, a random access memory (RAM), or a read-only memory (ROM).

Additionally and for similar reasons, personal digital assistants (not shown), cellular telephones (not shown), televisions (not shown), cable boxes (not shown), internet radios (not shown), and dedicated network devices (not shown) may use proxy application 98 executed on proxy computer 54 to configure media distribution system 18.

Further, the client electronic device need not be directly connected to proxy computer 54 for media distribution system 18 to be configured via proxy application 98. For example, assume that the client electronic device used to access media distribution system 18 is a cellular telephone. While cellular telephones are typically not physically connectable to e.g., proxy computer 54, proxy computer 54 may still be used to remotely configure media distribution system 18 for use with the cellular telephone. Accordingly, the configuration information (concerning the cellular telephone) that is entered via e.g., proxy computer 54 may be retained within media distribution system 18 (on computer 28) until the next time that the user accesses media distribution system 18 with the cellular telephone. At that time, the configuration information saved on media distribution system 18 may be downloaded to the cellular telephone.

For systems that include keyboards and larger displays (e.g., client computer 44), client application 46 may be used to configure media distribution system 18 for use with client computer 44.

Figure 4:
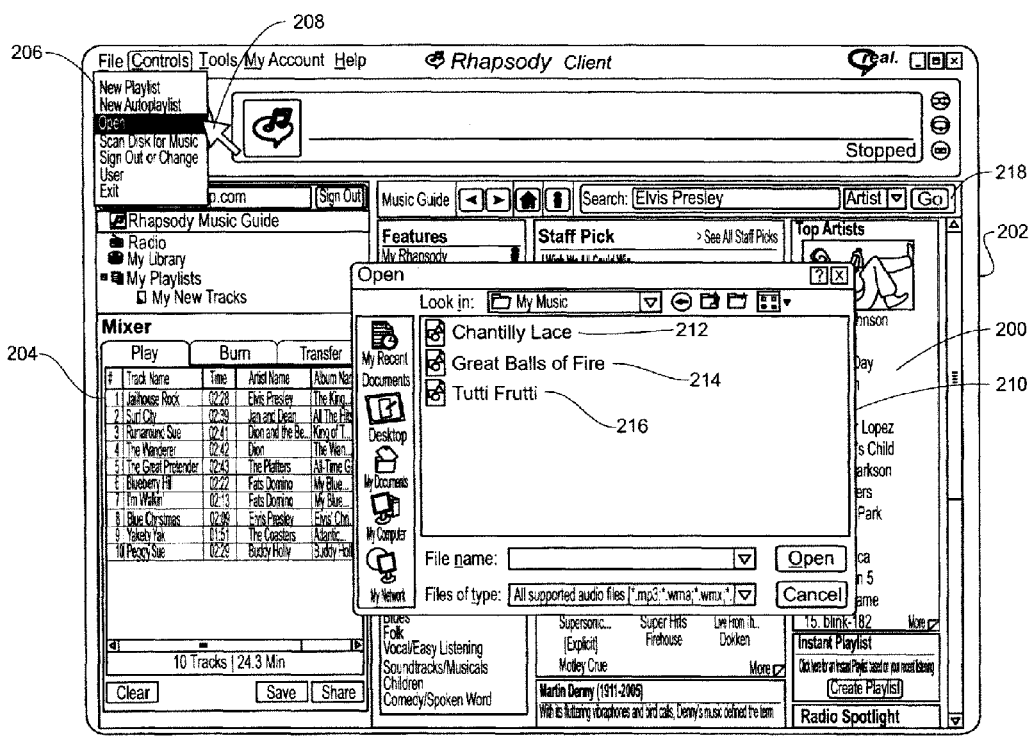
FIG. 4 is a display screen rendered by the client application of FIG. 1.

Referring also to FIG. 4, when using client application 46 to access media distribution system 18, user 22 may be presented with an information display screen 200 rendered by client application 46. Client application 46 typically includes a user interface 202 (e.g., a web browser) for interfacing with media distribution system 18 and viewing information display screen 200.

In addition to the below-described features, additional/complimentary features may also be included within client application 46. Examples of these additional/complimentary features may include: cross platform compatibility that allows client application 46 to process multiple files type/extensions; high compression/quality CODECs (coders/decoders) that allow client application 46 to compress/decompress high-quality audio/video files; file buffering that allows client application 46 to provide smoother playback of streaming media content; audio controls that allow the user to adjust the audio playback quality and characteristics of user application 46; video controls that allow the user to adjust the video playback quality and characteristics of user application 46; compact disc or optical media burning/ripping features that allow client application 46 (via client computer 44) to e.g., burn optical discs, extract media from optical discs, normalize volume across all tracks included within the optical media, and set up cross-fades and remove gaps between tracks; analog recording features that allow client application 46 to make digital copies of existing analog recordings; advanced audio playback features that allow client application 46 to reproduce multi-channel stereo sound; visualization features that allow client application 46 to display e.g., patterns that change in accordance with the track being rendered; customizable skins that allow the user to customize the look of client application 46; and built-in browsers that provide information to the user concerning the track being rendered.

When e.g., user 22 streams/downloads media content from e.g., computer 28, media distribution system 18 may monitor the media content streamed/downloaded to the user's client electronic device (e.g., client computer 44, for example), resulting in the generation of a media history file 100 for that user. While media history file 100 is typically maintained locally (e.g., maintained in a memory on client computer 44), media history file 100 may alternatively/additionally be maintained remotely (e.g., maintained on computer 28) as a remote media history file 100'.

The user (e.g., user 22) may save this media history file (or portions thereof) as a playlist. A playlist is typically a group of tracks (examples of which may include, but are not limited to, songs, videos, news broadcasts, sports broadcasts, etc.) that media distribution system 18 will render in sequence. This, in turn, allows the user to compile custom music compilations (in the form of multiple playlists).

A history window 204 may be rendered by client application 46 that itemizes the information contained within media history file 100. In this example, history window 204 itemizes ten (10) media data streams (e.g., "Jailhouse Rock"; "Surf City"; "Runaround Sue"; "The Wanderer"; "The Great Pretender"; "Blueberry Hill"; "I'm Walkin'"; "Blue Christmas"; "Yakety Yak"; and "Peggy Sue"), thus indicating that user 22 had previously listened to those ten (10) media data streams.

In addition to media data streams (i.e., media data streams received from a remote device e.g., computer 28), client application 46 allows user 12 to render local media data files. As discussed above, a local media data file may be a purchased download received from media distribution system 18 (i.e., media content licensed to e.g., user 14 for use in perpetuity); a subscription download received from media distribution system 18 (i.e., media content licensed to e.g., user 14 for use while a valid subscription exists with media distribution system 18); and/or a media data file extracted or retrieved (i.e., ripped) from e.g., a music compact disc, for example. These local media data files are typically stored locally on e.g., storage device 48 coupled to client computer 44.

If user 22 wishes to render a local media data file (i.e., a file stored on client computer 44), user 22 may e.g., select the file(s) to be rendered using client application 46. Accordingly, user 22 may select the dropdown "File" menu 206 using screen pointer 208, which is controllable by a pointing device (e.g., a computer mouse, not shown). Selecting the "Open" command may result in client application 46 rendering file management window 210, which allows user 22 to select local media data files for playback.

In this example, file management window 210 defines three (3) local media data files, namely: "Chantilly Lace" 212; "Great Balls of Fire" 214; and "Tutti Frutti" 216, all of which are stored within the folder "My Music". User 22 may select any (or all) of these files for playback on client application 46.

A search window 218 allows a user (e.g., user 22) to search for media content. For example, user 22 may enter search terms (e.g., "Elvis Presley"), select the appropriate term type (e.g., artist), and execute a query. In the event that multiple artists satisfy the query, a result set is generated from which user 22 may select e.g., the appropriate artist. Once the appropriate artist is selected, user 22 may review the various albums released by the selected artist (or that include tracks by the selected artist). User 22 may then render one or more of the various tracks included within any of the albums. Once a track is rendered, identifying information concerning the track rendered is added to local media history file 100 and/or remote media history file 100' and is included in history window 204. In addition to being able to search for media content by artist, user 14 may also be able to search for media content by e.g., keyword, track, album and/or composer.

Figure 5:
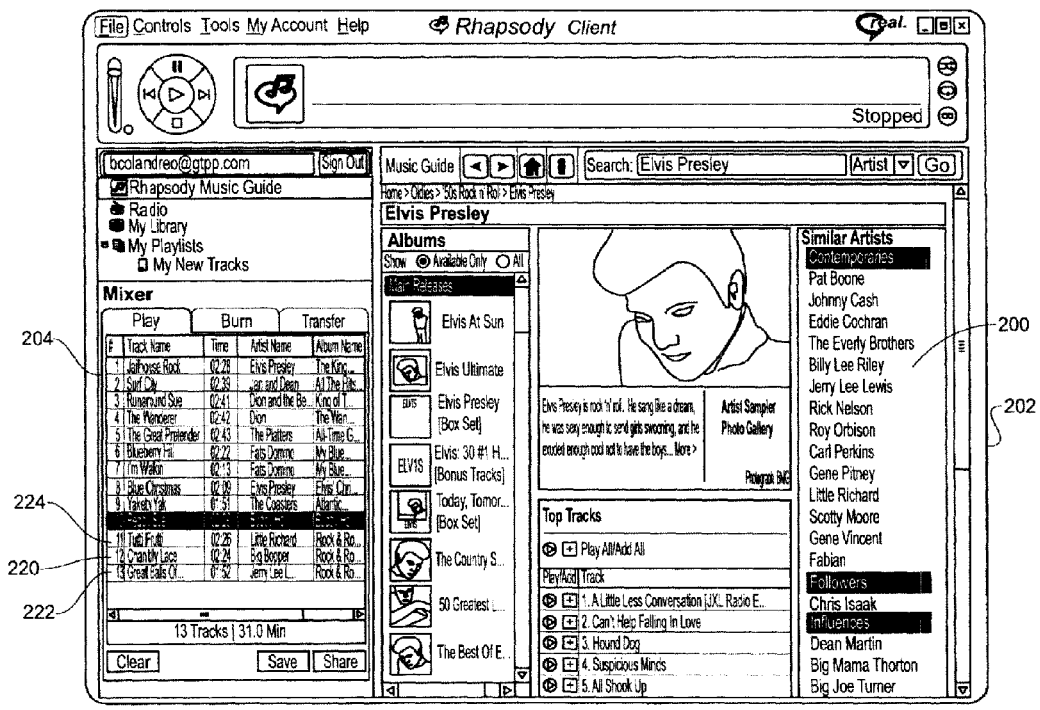
FIG. 5 is a display screen rendered by the client application of FIG. 1.

Referring also to FIG. 5 and assuming that user 22 selects all three local media data files for playback, media history file 100 is amended to include three additional entries, namely one for "Chantilly Lace"; one for "Great Balls of Fire"; and one for "Tutti Frutti". Accordingly, as history window 204 itemizes the information contained within media history file 100, history window 204 will include three additional entries (i.e., entries 220, 222, 224), which correspond to local media data file "Chantilly Lace" 212; local media data file "Great Balls of Fire" 214; and local media data file "Tutti Frutti" 216.

Assuming that user 22 wishes to save this collection of music for future playback, user 22 may save the current media history file 100 (or a portion thereof) as a playlist 102 (FIG. 1). While playlist 102 is typically maintained locally (e.g., maintained on client computer 44), playlist 102 may alternatively/additionally be maintained remotely (e.g., maintained on computer 28) as a remote playlist 102'.

Figure 6:
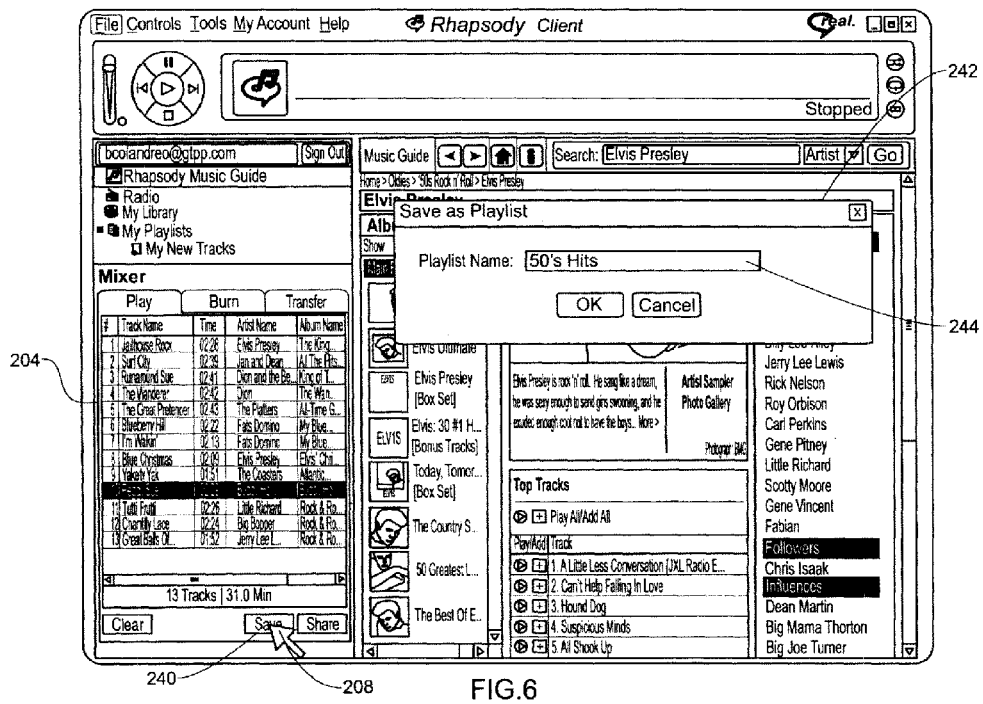
FIG. 6 is a display screen rendered by the client application of FIG. 1.

Referring also to FIG. 6, user 22 may select the "save" button 240 (using screen pointer 208). Once the "save" button 240 is selected, a playlist naming window 242 is rendered (by client application 46) that allows user 22 to specify a unique name for playlist 102 within the name field 244 of playlist naming window 242.

Assuming that user 22 selects "50's Hits" as a playlist name, playlist 102 is saved (i.e., as "50's Hits") and defines the location of all of the pieces of media content itemized within history window 204.

Figure 7:
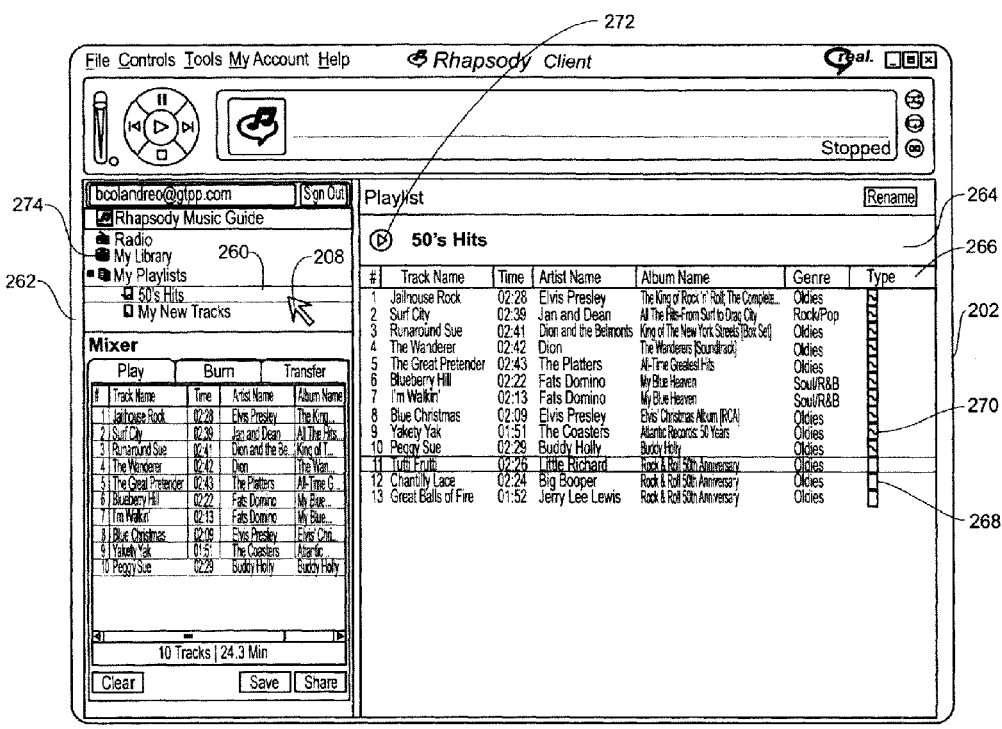
FIG. 7 is a display screen rendered by the client application of FIG. 1.

Referring also to FIG. 7, once playlist 102 is stored, a link 260 to playlist 102 (e.g., "50's Hits") appears in directory window 262. User 22 may then select link 260 using screen pointer 208. Once selected, the tracks included within playlist 102 (e.g., "50's Hits") are itemized within a playlist window 264 (e.g., a web page) viewable via user interface 202. As discussed above, ten of these entries (namely "Jailhouse Rock"; "Surf City"; "Runaround Sue"; "The Wanderer"; "The Great Pretender"; "Blueberry Hill"; "I'm Walkin'"; "Blue Christmas"; "Yakety Yak"; and "Peggy Sue") define the location of media data streams and three of these entries (namely "Tutti Frutti"; "Chantilly Lace"; and "Great Balls of Fire") define the location of media data files.

Typically, playlist window 264 includes hyperlinks that locate (i.e., provide addresses for) the streams/files associated with the individual entries itemized within playlist 102. This location information is stored within playlist 102. For example, the following table correlates the track name of an entry in playlist 102 with an address for the stream/file associated with that track name:

| Track Name | Address |
| --- | --- |
| Jailhouse Rock | www.musicshop.com\songs\jailhouse_rock.ram |
| Surf City | www.musicshop.com\songs\surf_city.ram |
| Runaround Sue | www.musicshop.com\songs\runaround_sue.ram |
| The Wanderer | www.musicshop.com\songs\the_wanderer.ram |
| The Great Pretender | www.musicshop.com\songs\the_great_pretender.ram |
| Blueberry Hill | www.musicshop.com\songs\blueberry_hill.ram |
| I'm Walkin' | www.musicshop.com\songs\im_walkin.ram |
| Blue Christmas | www.musicshop.com\songs\blue_christmas.ram |

-continued

| Track Name | Address |
|---|---|
| Yakety Yak | www.musicshop.com\songs\yakety_yak.ram |
| Peggy Sue | www.musicshop.com\songs\peggy_sue.ram |
| Tutti Frutti | c:\my music\tutti_frutti.mp3 |
| Chantilly Lace | c:\my music\chantilly_lace.mp3 |
| Great Balls of Fire | c:\my music\great_balls_of_fire.mp3 |

As the first ten entries (namely "Jailhouse Rock"; "Surf City"; "Runaround Sue"; "The Wanderer"; "The Great Pretender"; "Blueberry Hill"; "I'm Walkin'"; "Blue Christmas"; "Yakety Yak"; and "Peggy Sue") identify media data streams, the address provided for each entry points to a media stream available from e.g., media distribution system 18. Further, as the last three entries (namely "Tutti Frutti"; "Chantilly Lace"; and "Great Balls of Fire") identify media data files, the address provided for each entry points to a media data file available from e.g., client computer 44.

Playlist window 264 is typically tabular and may include a column 266 identifying a media type (i.e., media data stream or media data file, for example) for each entry within playlist window 264. Typically, column 266 includes icons that identify the media type (e.g., icon 268 identifies a media data file and icon 270 identifies a media data stream). User 22 may select the "play" button 272 to render playlist 102.

As discussed above, media distribution system 18 typically provides media data streams and/or media data files to users (e.g., user 22). Typically, metadata is associated with each media data stream provided by media distribution system 18. This metadata may include (but is not limited to) an artist identifier, an album identifier, a track identifier, an album cover image, and a music genre identifier, for example.

Accordingly, whenever e.g., user 12 renders a remote media data stream, media distribution system 18 may compile and save this metadata (on a per-user basis) to track e.g., listening trends and musical preferences of individual users, for example.

As discussed above, a local media data file may be a purchased download received from media distribution system 18 (i.e., media content licensed to e.g., user 14 for use in perpetuity); a subscription download received from media distribution system 18 (i.e., media content licensed to e.g., user 14 for use while a valid subscription exists with media distribution system 18); and/or a media data file extracted (i.e., ripped) from e.g., a music compact disc, for example.

If the purchased download and/or the subscription download were provided by media distribution system 18, these local media data files would typically also include the metadata described above and such metadata and downloaded/streamed content may be stored in the memory of the client computer 44. Accordingly, when these purchased/subscription downloads are rendered by e.g., user 22, the metadata concerning these purchased/subscription downloads may be transmitted from computer 44 to computer 28, such that the metadata is compiled and saved in a memory of the server computer 28 (on a per user basis) to track e.g., listening trends and musical preferences, for example.

However, for media data files that were e.g., extracted from music compact discs, these data files may not include the above-described metadata. As discussed above, media data files (i.e., files stored in a memory on client computer 44) may be rendered using client application 46 and added to playlists (e.g., playlist 102) also stored in memory of client computer 44. Accordingly, whenever user 22 attempts to add a media data file (that does not include metadata) to a playlist (e.g., playlist 102), user 22 may be prompted to provide metadata concerning that media data file.

Figure 8:
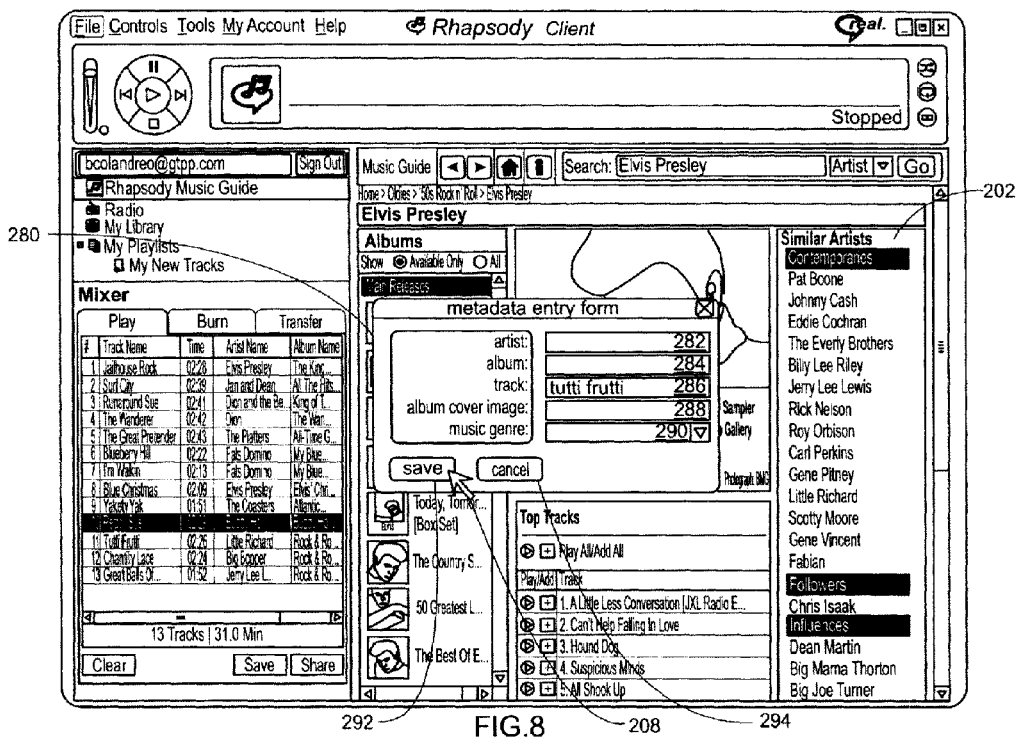
FIG. 8 is a display screen rendered by the client application of FIG. 1.

Referring also to FIG. 8 and continuing with the above-stated example, if user 22 attempts to save a playlist (e.g., playlist 102) that includes three local media data files (namely "Tutti Frutti"; "Chantilly Lace"; and "Great Balls of Fire"), assuming for this embodiment that these three local media data files do not include metadata, client application 46 may render a metadata entry form 280 that allows user 22 to enter metadata concerning each of the three media data files.

In this example, metadata entry form 280 includes five user-editable fields, namely an artist field 282, an album field 284, a track field 286, an album cover image field 288, and a music genre field 290. Album cover image field 288 may allow user 22 to define a drive, a path, and a filename for an album cover image. Music genre field 290 may be a drop-down menu (operable via screen pointer 208) that allows user 22 to select a music genre from a number of predefined music genres (not shown).

Typically, if the title of the media data file is descriptive of the track name, the track field 286 may be automatically populated with what client application 46 suspects is the track title. As the first local media data file is named "tutti frutti", track field 286 would typically be populated with the suspected name "tutti frutti". User 22 may populate the remaining fields and select the save button 292 (using screen pointer 208) or alternatively select the cancel button 294.

In order to further automate the metadata generation process, client application 44 may interface with a remote metadata database (not shown) served by e.g., media distribution system 18 or a third party (not shown). This metadata database may define metadata for various tracks and albums. An example of such a database is the CDDB™ database maintained by Gracenote™ of Emeryville, Calif. (www.gracenote.com). For example, if user 22 ripped each track from an entire compact disc, the metadata database may be accessed by client application 44 and a query may be structured that defines e.g., the total number of tracks included on the compact disc or optical media, the length of each track included on the compact disc, and the total length of the compact disc. Assuming that a definitive result is produced by this query, the metadata for each track ripped from the compact disc would be produced. In the event that an indefinite result set (i.e., one that identifies multiple possible compact discs) is generated, user 22 may be prompted to select the appropriate compact disc from a list of possible matches (not shown).

Figure 9A:
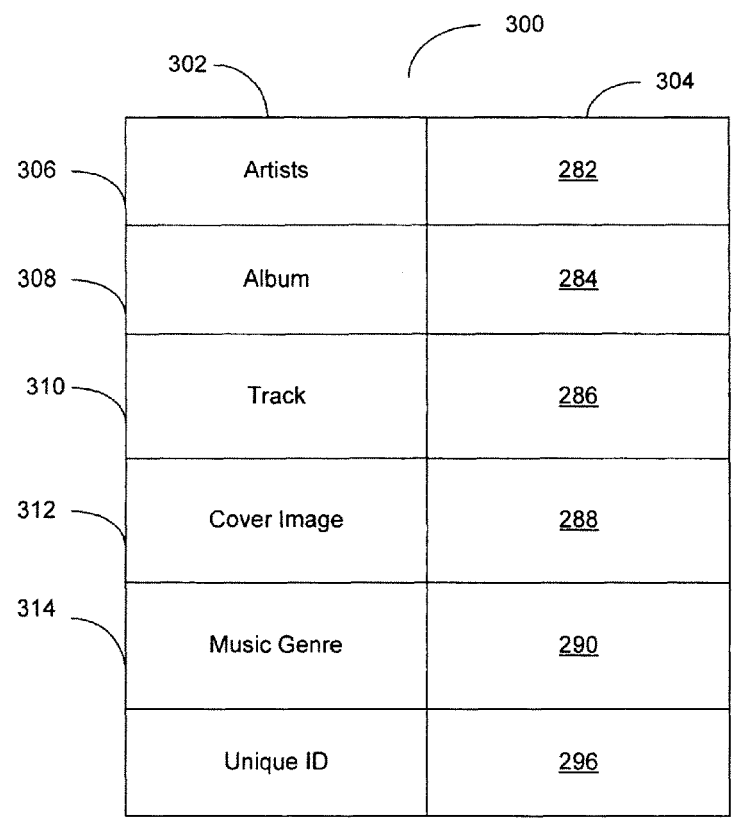
FIG. 9a is a diagram of one exemplary homogeneous metadata file.

Metadata entered using the aforementioned metadata entry form 280 (and other metadata which may exist for media content) may be stored in a homogeneous file format. "Homogeneous" as used herein with reference to the format of the metadata 300 may be defined as a file format having generally the same structure, for example, metadata, for each piece of media content, having generally the same number of columns and rows and generally containing the same type of information. One exemplary homogeneous metadata file format 300 is depicted in FIG. 9a. The exemplary homogeneous metadata file format 300 may include a plurality of defined data fields, for example, an artist field 282, an album field 284, a track field 286, an album cover image field 288, and a music genre field 290, each arranged in respective rows and columns of the metadata file format 300, as depicted. Here, each row (306, 308, 310, 312 and 314) of column 302 may define a respective data field, and each corresponding row of column 304 may define a respective data entry for a corresponding data field.

Of course, alternatively, the data may be arranged in respective columns and rows (not shown) without departing from this embodiment. Further, metadata file format 300 may have a fixed association between data fields, and the row (or column) where the data is entered. In other words, each row may be assigned a unique data field and associated data entry. Thus for example, a data field may exist for "Artist" and the data value for that field may be "Elvis". Of course, these are only examples of the data that may populate the homogeneous metadata 300, and it is equally contemplated herein that metadata 300 may comprise different and/or additional information without departing from this embodiment. Additionally, client application 46 may generate a unique ID 296 for the homogeneous metadata 300. The unique ID may comprise, for example a unique alpha-numeric code. The homogeneous metadata may be linked to the piece of local content to which it describes. The linking may be accomplished by assigning the unique identifier to the homogeneous metadata file. Client application 46 may also push the homogeneous metadata file 300 up to the server system 28 (independently of the actual local media content), to permit, for example, other users to have access to metadata associated with one or more user's local content via the media distribution system 18.

As stated above, local content may be ripped from, e.g., an optical disk owned by user 22. Local content may also comprise media data files associated with other media programs, for example, Windows media file and/or file-sharing media distribution systems, for example, Napster media files or Kazaa media files. Additionally and as discussed above, local content may include media data files downloaded/obtained from remote media servers (e.g., computer 28). As such, local content may contain pre-existing metadata associated with a media file. "Pre-existing metadata", as used herein, may be defined as metadata that has been created by a system other than the system set forth in FIG. 1 (or any component thereof), for example, metadata created by third party content providers and/or individuals. "Pre-existing metadata", as used herein, may also be defined as metadata that is created using a previous version of any of the applications described herein with reference to the system of FIG. 1. Pre-existing metadata may comprise different and/or additional data not found in the metadata file format 300, and/or the data fields in pre-existing metadata may be assembled in a different manner than the metadata file format 300. Accordingly, in an alternative or additional embodiment to metadata entry described above with reference to FIG. 8, client application 46 may be capable of determining the presence of pre-existing metadata associated with one or more local content items. Client application 46 may further be capable of determining the existence of data in one or more data fields of the pre-existing metadata. Client application 46 may also be capable of mapping data from one more data fields of the pre-existing metadata to a new metadata file that complies or is compatible with the homogeneous metadata file format 300.

Figure 9B:
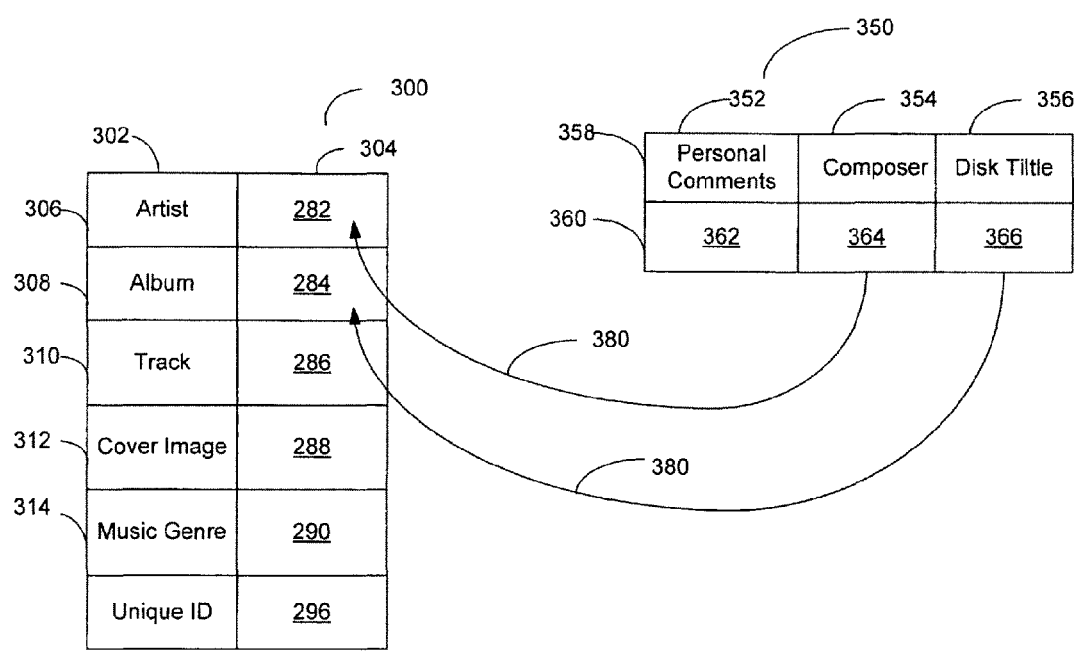
FIG. 9b is a diagram of exemplary mapping operations between homogeneous metadata and pre-existing metadata.

One exemplary mapping process is depicted in FIG. 9b. On the left of this Figure is the homogeneous metadata file format 300 and on the right is a pre-existing metadata file format 350. The pre-existing metadata file format 350 may be arranged differently than the homogeneous metadata file format 300 in that the data fields may be arranged differently and/or the data fields may be labeled differently. For example, the pre-existing metadata file format 350 may be formatted as a table of two rows 358, 360 and a plurality of columns, 352, 354 and 356. Additionally, the data entry associated with "Artist" may be located at a different location, for example, the second row 356 in file format 350, as opposed to the first row 306 in the homogeneous file format. Moreover, the label of the data field may differ, for example "Composer" in the pre-existing metadata 350 is different than "Artists" in metadata 300, but the data contained in this field may be similar.

Thus, in one embodiment, client application 46 may be capable of parsing the data fields of the pre-existing metadata 350 to determine if an exact match of a data field in the homogeneous metadata format 300 exists. If an exact match between data fields is found, client application 46 may map the data from the pre-existing metadata into the homogeneous metadata file format 300. However, since it may be likely that the data fields may be labeled differently between the metadata format 300 and the pre-existing metadata 350, client application 46 may also be capable of parsing the data fields of the pre-existing metadata and comparing based on, for example, synonyms which may be used for labels of the data fields contained in the pre-existing metadata 350. Thus, continuing with this example, client application 46 may be capable of comparing the data fields of metadata 300 to metadata 350 and matching synonymous data fields. For example, "Composer" may be synonymous with "Artist" and thus the data in field 364 may be mapped to field 282 (as indicated by arrow 380). Likewise, "Disk Title" may be synonymous with "Album", and thus the data in field 366 may be mapped to field 284 (as indicated by arrow 382). Of course, client application 46 may utilize a wide range of synonyms to use when comparing data fields in metadata 300 to data fields in metadata 350.

The pre-existing metadata 350 may contain additional data that is not utilized in the homogeneous metadata 300. For example, pre-existing metadata 350 may have a data field "Personal Comments" 362. However, a similar data field may not exist in the homogeneous metadata 300. In this event, client application 46 may be capable of discarding selected data from the pre-existing metadata 350. Once client application has composed the homogeneous metadata 300 from the pre-existing metadata 350, client application may completely delete the pre-existing metadata 350 and any association it may have with the local media content.

Client application 46 may use at least a portion of homogeneous metadata 300 to generate a playlist file (e.g., playlist 102; FIG. 1) identifying (e.g., defining and locating) one or more media content files associated with the playlist. Client application 46 may use a portion of homogenous metadata 300 to render information indicative of at least a portion of homogeneous metadata 300 in a format discernible by a user. For example, the playlist "50's Hits" is shown within playlist window 264 (FIG. 7) to include a plurality of columns (e.g., "Track Name", "Time", "Artist Name", "Album Name", "Genre" and "Type"), wherein at least a portion of the data populating the fields within these columns may be indicative of data included within homogeneous metadata 300. While the format of the data presented to the user is shown to be text-based, other configurations are possible. For example, the data within playlist window 264 (or a track being rendered) may be presented to the user in a voice-based format.

A portion of homogeneous metadata 300 may be used by client application 46 to generate a library file identifying one or more media content files associated with the library file. Similar to a playlist, a library file allows a user to group, define and locate individual media content files that may include e.g., streamed subscription tracks and albums, downloaded subscription tracks, purchased tracks and albums, and/or tracks ripped from a compact disc. Once a library file is defined, the library file may be itemized by user application 46 under the "My Library" tab 274 (FIG. 7) within directory window 262.

Additionally, upon user application 46 rendering a media content file, user application 46 may provide a portion of homogeneous metadata 300 to e.g., computer 28 to indicate the rendering of one or more media content files, thus allowing for the tracking of a user's listening/viewing habits and/or use by server computer 28 to automatically generate or propose playlists for user 14, as disclosed and claimed in U.S. patent application Ser. No. 11/242,315, filed 3 Oct. 2005, and entitled "System and Method for Supplementing a Radio Playlist with Local Content"; and U.S. patent application Ser. No. 11/322,716, filed 30 Dec. 2005, and entitled "System and Method for Updating a Playlist Based Upon Ratings", each of which is herein incorporated by reference.

Figure 9C:
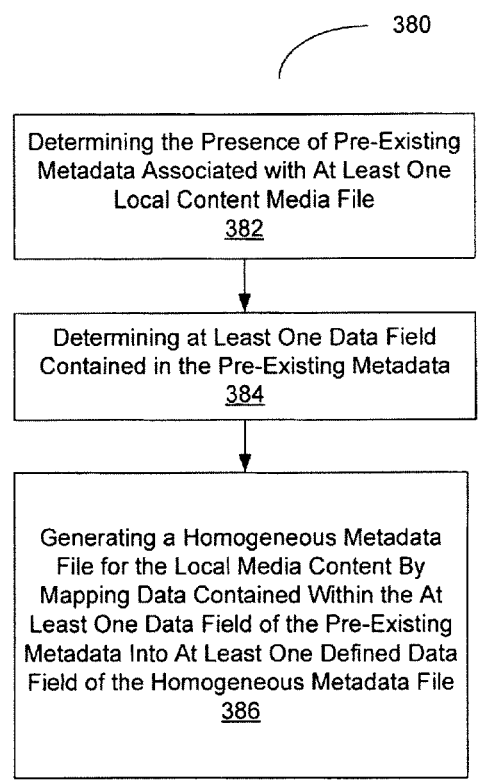
FIG. 9c is a flowchart illustrating exemplary operations according to an embodiment.

FIG. 9c is a flowchart 380 depicting exemplary operations which may be performed according to an embodiment. Operations may include determining the presence of pre-existing metadata associated with at least one local media content file 382. Operations may further include determining at least one data field contained within the pre-existing metadata 384. Operations may further include generating a homogeneous metadata file for the local media content by mapping data contained within at least one data field of the pre-existing metadata into at least one defined data field of the homogeneous metadata file 386.

Although the foregoing description of FIGS. 9a-9c makes specific reference to operation associated with client application 46, it is equally contemplated herein that media distribution system 18, device application 64 (described more fully below), proxy application 98 (described more fully below) and/or desktop application 70 may be capable, collectively or individually, of performing operations attributed to client application 46.

As discussed above, the type of interface used by the user (when configuring media distribution system 18 for a client electronic device) may vary depending on the type and the capabilities of the client electronic device to which the media content is being streamed/downloaded. Accordingly and as discussed above, media distribution system 18 may be configured for personal media device 12 via proxy application 98 executed on proxy computer 54.

Proxy application 98 may be automatically executed upon personal media device 12 being placed into docking cradle 60 by e.g., user 14. Alternatively, proxy application 98 may be fully or partially loaded upon boot up of proxy computer 54. Proxy application 98 may then operate in the background until personal media device 12 is placed into docking cradle 60, at which time proxy application 98 may be fully loaded and/or moved to the foreground for execution. Further, proxy application 98 may be manually executed by user 14. As will be discussed below in greater detail, proxy application 98 (once executed) may be used to e.g., configure personal media device 12 and transfer media data files to and remove media data files from personal media device 12, for example.

Figure 10:
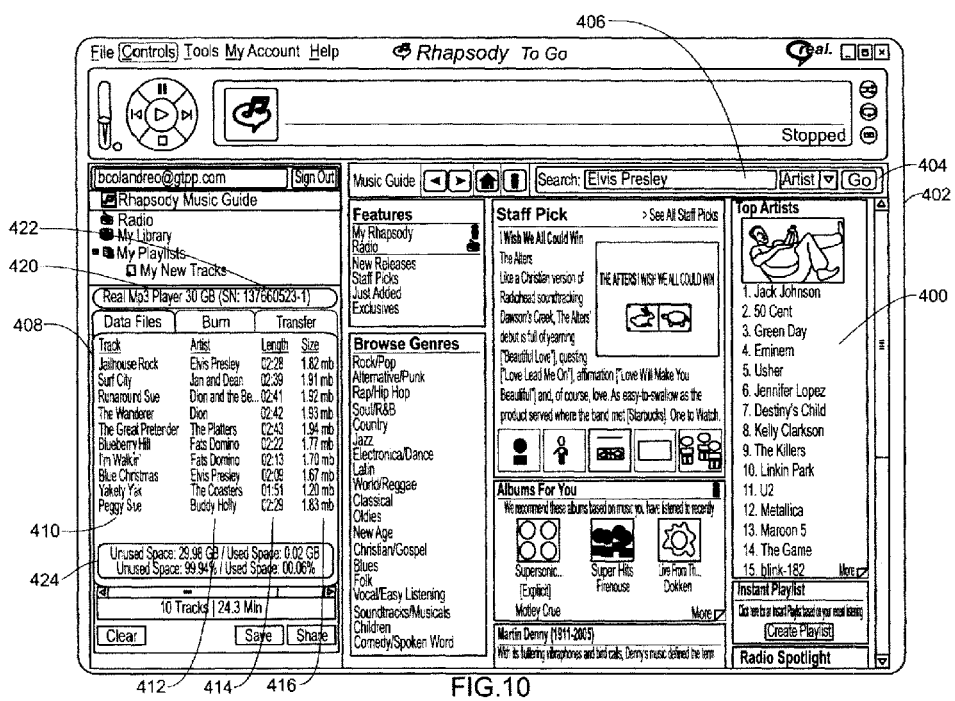
FIG. 10 is a display screen rendered by the proxy application of FIG. 1.

Referring also to FIG. 10, when using proxy application 98 to access media distribution system 18, user 14 may be presented with an information display screen 400 rendered by proxy application 98. Proxy application 98 typically includes a user interface 402 (e.g., a web browser) for interfacing with media distribution system 18 and viewing information display screen 400.

A search window 404 allows a user (e.g., user 14) to search for media content. For example, user 14 may enter search terms (e.g., "Elvis Presley") into search field 406, select the appropriate term type (e.g., artist), and execute a query. In the event that multiple artists satisfy the query, a result set is generated from which user 14 may select e.g., the appropriate artist. Once the appropriate artist is selected, user 14 may review the various albums released by the selected artist (or that include tracks by the selected artist). User 14 may then download (for use on personal media device 12) one or more of the various tracks included within any of the albums. In addition to being able to search for media content by artist, user 14 may also be able to search for media content by e.g., keyword, track, album and/or composer.

Additionally, in a fashion similar to that of client application 46, proxy application 98 may be configured to allow user 12 to render (via proxy computer 54) one or more of the various tracks included within any of the albums of the selected artist.

A content window 408 may be rendered by proxy application 98 that allows user 14 to review the contents of personal media device 12. As discussed above, personal media device 12 is coupled to proxy computer 54 via e.g., a USB port, serial port, or FireWire port. Upon or during execution of proxy application 98, proxy application 98 may poll personal media device 12 to retrieve information concerning the media content currently on device 12. This polling may occur in a fashion similar to the manner in which the content of a USB hard drive is determined. In this particular example, content window 408 includes ten (10) entries, namely: "Jailhouse Rock"; "Surf City"; "Runaround Sue"; "The Wanderer"; "The Great Pretender"; "Blueberry Hill"; "I'm Walkin'"; "Blue Christmas"; "Yakety Yak"; and "Peggy Sue", thus indicating that ten (10) media data files had been previously downloaded to personal media device 12, which are typically stored on storage device 66 of personal media device 12.

Content window 408 may be tabular and itemize various pieces of information concerning the downloaded files, including the track 410, the artist 412, the track length 414 and the track size 416. Additionally, proxy application 98 may poll personal media device 14 to retrieve device identification information, which is rendered within a device type field 420 and a device serial number field 422 included within content window 448. Further, content window 408 may include a summary information field 424 concerning the current capacity of device 12, including one or more of e.g., "Unused Space" in gigabytes; "Used Space" in gigabytes; "Unused Space" in percentage of total capacity; and "Used Space" in percentage of total capacity, for example.

Figure 11:
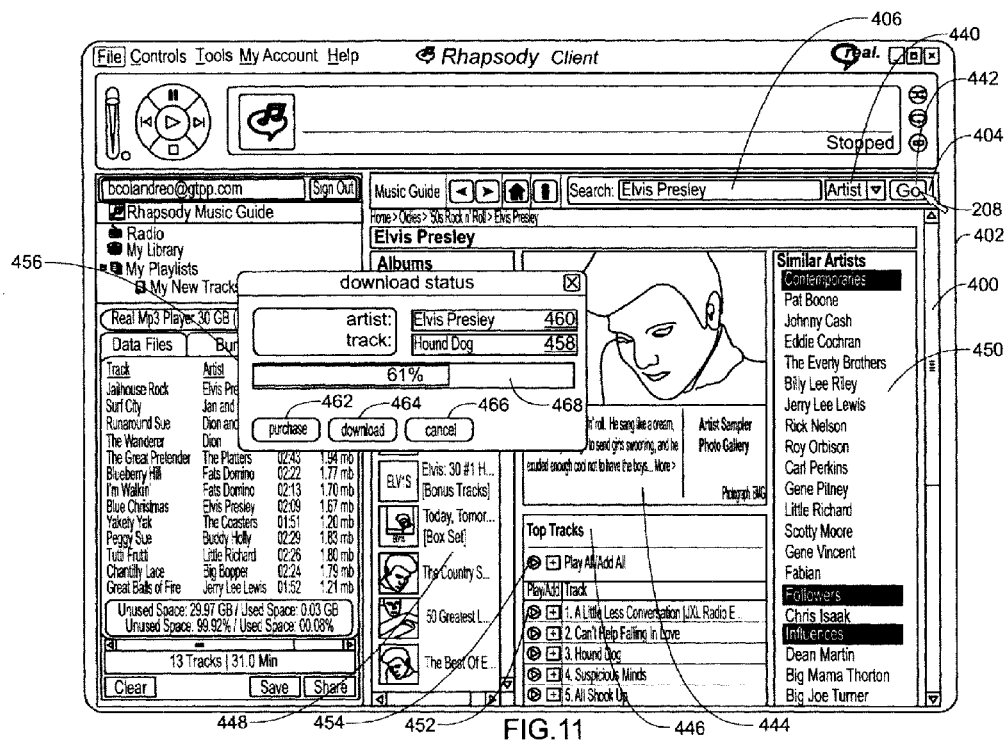
FIG. 11 is a display screen rendered by the proxy application of FIG. 1.

Referring also to FIG. 11 and continuing with the above-stated example, assume that user 14 enters the search term "Elvis Presley" into search field 406 of search window 404, selects the term type "artist" via dropdown menu 440, and executes the query by selecting the "Go" button 442 with screen pointer 208.

Assuming that no other artist satisfies the query, information screen 400 may be presented to user 14 with information concerning Elvis Presley, which may include: an artist information screen 444, a top track list 446, an album list 448, and a similar artist list 450, for example.

User 14 may download media data files from media distribution system 18 for use on personal media device 12 by selecting the download button 452 corresponding to the track to be downloaded. Additionally, user 14 may download groups of tracks (e.g., each track included within top track list 446, or all tracks included within a single album) by selecting the download all button 454 corresponding to the tracks to be downloaded.

Once user 14 selects a track for downloading, proxy application 98 may render a download window 456 that e.g., includes a track title field 458 that identifies the title of the track being downloaded and an artist field 460 that identifies the artist of the track being downloaded.

As discussed above, files may be downloaded from media distribution system 18 as purchased downloads (i.e., media content licensed to e.g., user 14 for use in perpetuity), or subscription downloads (i.e., media content licensed to e.g., user 14 for use while a valid subscription exists with media distribution system 18). Provided user 14 has a current subscription with media distribution system 18, there is typically no additional fee charged for each subscription download, as the downloaded media content is only renderable while the user has a valid subscription. However, a user typically must pay a fee (e.g., 79¢, 89¢, or 99¢, for example) for each purchased download, as the media content is renderable regardless of the status of the user's subscription.

Accordingly, download window 456 may include a purchase button 462 and a download button 464, both of which are selectable via screen pointer 208. In this example, if user 14 selects purchase button 462 with screen pointer 208, a media data file for "Hound Dog" by "Elvis Presley" will be transferred from computer 28 to personal media device 12. Typically, user 14 will be charged e.g., a one-time download fee for downloading this media data file. However, as this is a purchased download, the media data file received is renderable regardless of the status of the user's subscription with media distribution system 18.

Alternatively, if user 14 selects download button 464 with screen pointer 208, a media data file for "Hound Dog" by "Elvis Presley" will be transferred from computer 28 to personal media device 12. Typically, user 14 will not be charged a fee for downloading this media data file. However, as this is a subscription download, the media data file received is only renderable while user 14 has a valid subscription with media distribution system 18.

Download window 456 typically also includes a cancel button 466 for allowing user 14 to cancel the download and close download window 456.

If user 14 selects either purchase button 462 or download button 464, the download of the selected media data file will be initiated. Download window 456 may include a download status indicator 468 for indicating the progress of the download of e.g., "Hound Dog" by "Elvis Presley".

Figure 12:
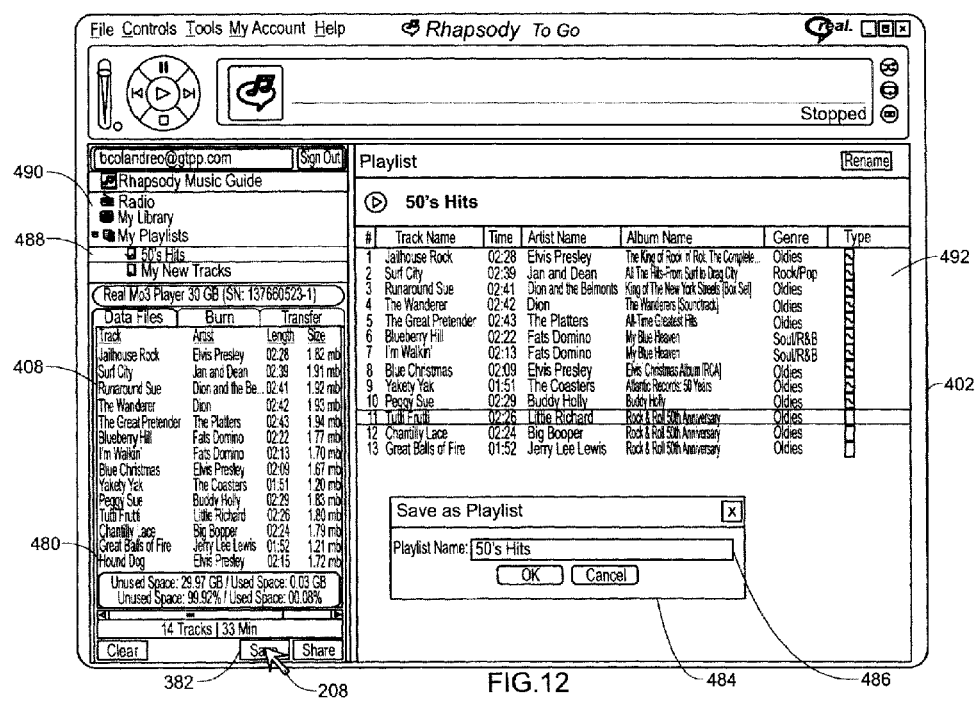
FIG. 12 is a display screen rendered by the proxy application of FIG. 1.

Referring also to FIG. 12, once the download of the media data file for "Hound Dog" by "Elvis Presley" is completed, content window 348 will be updated to include an entry 480 for "Hound Dog" by "Elvis Presley", indicating that "Hound Dog" by "Elvis Presley" was successfully downloaded from media distribution system 18 to personal media device 12.

In a fashion similar to that described above concerning client application 46, user 14 may use proxy application 98 to define playlists concerning various media data files stored on personal media device 12. For example, assume that user 14 wished to save the first thirteen tracks (namely "Jailhouse Rock"; "Surf City"; "Runaround Sue"; "The Wanderer"; "The Great Pretender"; "Blueberry Hill"; "I'm Walkin'"; "Blue Christmas"; "Yakety Yak"; "Peggy Sue"; "Tutti Frutti"; "Chantilly Lace"; and "Great Balls of Fire") as a playlist, user 14 would highlight the desired selection of tracks (using screen pointer 208) and select the save button 482 using screen pointer 208. A playlist naming window 484 may be rendered (by proxy application 98) that allows user 14 to specify a unique name for the playlist within the name field 486 of playlist naming window 484.

Assuming that user 14 selects "50's Hits" as a playlist name, playlist 104 (FIG. 1) named "50's Hits" is defined that locates (within personal media device 12) all of the pieces of media content itemized within playlist 104. Once playlist 104 is stored, a link 488 to playlist 104 (e.g., "50's Hits") appears in directory window 490. User 14 may then select link 488 using screen pointer 208.

Once selected, the tracks included within playlist 104 (e.g., "50's Hits") are typically itemized within a playlist window 492 (e.g., a web page) viewable via user interface 402.

As with the playlists described above as being generated using client application 44, playlists generated using proxy application 98 are typically maintained locally (e.g., maintained on personal media device 12). However and as discussed above, playlists may alternatively/additionally be maintained remotely (e.g., maintained on computer 28) as remote playlist 104'.

Device Initialization:

Media distribution system 18 is typically a subscription-based service, in that e.g., user 14 subscribes to media distribution system 18 and pays e.g., a monthly subscription fee to be granted access to media distribution system 18. Once user 14 subscribes to media distribution system 18, user 14 may obtain media content (for use with personal media device 12) in the form of: purchased downloads received from media distribution system 18 (i.e., media content licensed to e.g., user 14 for use in perpetuity); subscription downloads received from media distribution system 18 (i.e., media content licensed to e.g., user 14 for use while a valid subscription exists with media distribution system 18); and media content streamed from media distribution system 18, for example. Typically, when accessing media distribution system 18, user 14 must provide user "credentials" that identify the user (e.g., user 14) and/or the device (e.g., device 12) to media distribution system 18. Upon receiving these credentials, media distribution system 18 may attempt to verify the credentials and, if verified, grant user 14 and/or device 12 access to media subscription system 18. The credentials received and verified by media distribution system 18 may include, but are not limited to, a user name, a user password, a user key, a device name, a device password, a device key, and/or one or more digital certificates.

Typically, upon personal media device 12 being placed into docking cradle 60, personal media device 12 establishes a connection with media distribution system 18 via proxy computer 54. As discussed above, proxy computer 54 may function as an Internet gateway for personal media device 12 and, therefore, allow personal media device 12 to access computer 28 and media distribution system 18.

Once a connection is established with media distribution system 18, DRM process 10 may be initiated. DRM process 10 is typically executed at the time personal media device 12 is initially configured (i.e., the first time personal media device 12 establishes a connection with media distribution system 18). As will be discussed below in greater detail, DRM process 10 may be systematically and repeatedly executed to verify that device 12 (and/or user 14) are active subscribers of media distribution system 18.

Figure 13A:
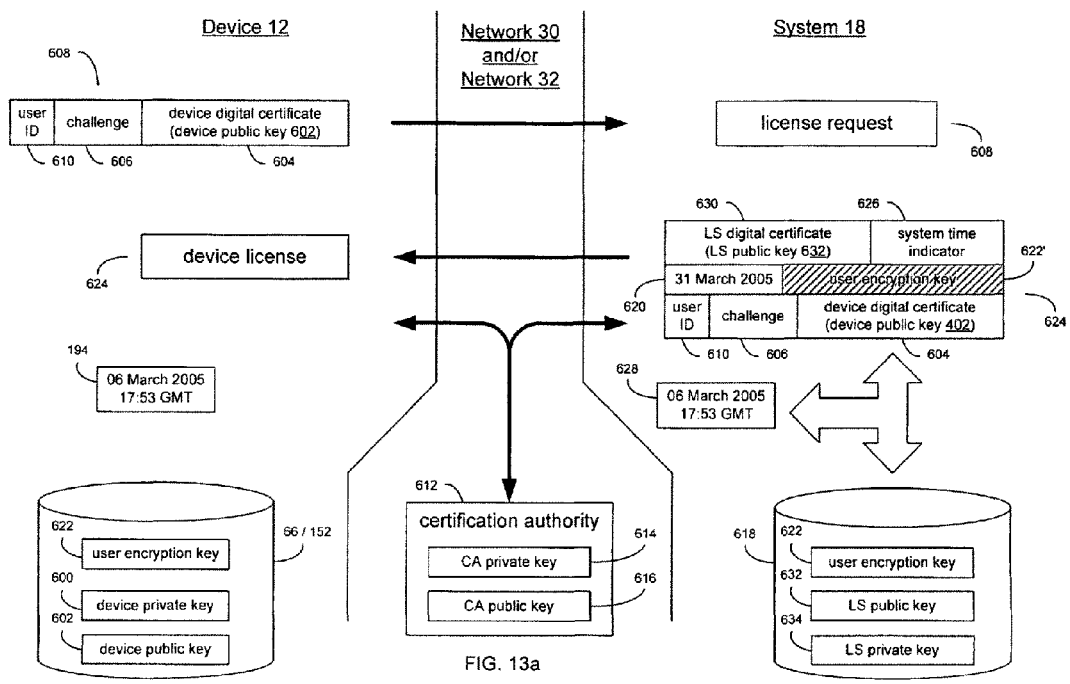
FIG. 13a is a diagrammatic view of the media distribution system, personal media device, and distributed computing network of FIG. 1.
Figure 13B:
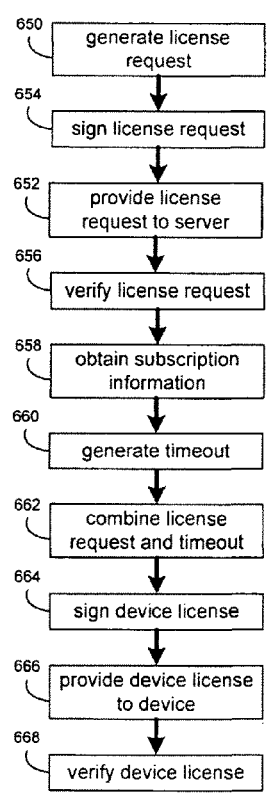
FIG. 13b is a flowchart of a process executed by the DRM process of FIG. 1.

Referring also to FIGS. 13a & 13b, at the time of manufacture, personal media device 12 may include a private encryption key (e.g., device private key 600) and a public encryption key (e.g., device public key 602) stored in non-volatile memory (e.g., ROM 152 and/or storage device 66). Keys 600, 602 may be 1024-bit asymmetric encryption keys and may be referred to as DRM (i.e., digital rights management) keys.

As is known in the art, a private key/public key encryption methodology allows users of an unsecure network (e.g., the Internet) to securely exchange data through the use of a pair of encryption keys, namely the private encryption key (e.g., device private key 600) and the public encryption key (e.g., device public key 602). The private key/public key encryption methodology is typically referred to as an asymmetric encryption methodology, in that the key used to encrypt a message is different than the key used to decrypt the message.

In private key/public key encryption, the private encryption key (e.g., device private key 600) and the public encryption key (e.g., device public key 602) are typically created simultaneously using the same algorithm (e.g., the RSA algorithm created by Ron Rivest, Adi Shamir, and Leonard Adlemana, for example). Device private key 600 is typically given only to the requesting party and device public key 602 is typically made publicly available (e.g., as part of digital certificate 604). Typically, device private key 600 is not shared and is maintained securely within e.g., personal media device 12.

Accordingly, when a secure message is to be sent from a sender to a recipient, the public key (e.g., device public key 602) of the recipient (which is readily accessible to the sender) is used to encrypt the message. Once encrypted, the message is sent to the recipient and can only be decrypted using the recipient's private key (e.g., device private key 600). As private key 600 is maintained securely by the recipient, only the recipient can decrypt the encrypted message.

In addition to encrypting and decrypting messages, a sender may authenticate their identity by using their private key (e.g., device private key 600) to encrypt a digital certificate, which is then sent to a recipient (i.e., the person to which they are authenticating their identity). Accordingly, when the digital certificate is received by the recipient, the recipient can decrypt the encrypted digital certificate using the sender's public key (e.g., device public key 602), thus verifying that the digital certificate was encrypted using the sender's private key (e.g., device private key 600) and, therefore, verifying the identity of the sender.

DRM process 10 may generate a challenge 606, which is typically a random number generated by a random number generation process (not shown) included within personal media device 12. Once generated, challenge 606 is paired with device digital certificate 604 (which typically includes device public key 602) to generate 650 a license request 608. Device digital certificate 604, which may be referred to as a DRM digital certificate, may include additional information such as a device serial number (e.g., 137660523-1 from device serial number field 422, FIG. 10), for example.

As discussed above, proxy application 98 allows the owner of device 12 (e.g., user 14) to: configure device 12 for use with media distribution system 18; and configure media distribution system 18 for use with device 12. Typically, when proxy application 98 is configured on proxy computer 54, user 14 may be required to provide user credentials that identify the user (e.g., user 14) and define a valid subscription that would allow user 14, device 12, and proxy application 98 to access media distribution system 18. Alternatively or additionally, personal media device 12 may be configured to allow the user (e.g., user 14) to directly enter the user credentials (via device 12) when device 12 is initially configured.

DRM process 10 may provide license request 608 (via network 30 and/or network 32) to media distribution system 18. Additionally, if defined within personal media device 12, a user ID 410 (e.g., enumerating the user credentials described above) may also be included within license request 608. As discussed above, the user credentials (i.e., included within user ID 610) may include, but are not limited to, a user name, a user password, a user key, a device name, a device password, a device key, and/or one or more digital certificates. Prior to being provided 652 to media distribution system 18, DRM process 10 may digitally sign 654 license request 608 using device private key 600.

A digital signature is an electronic signature that uses the private key/public key encryption methodology (described above) and allows a sender of a message to authenticate their identity and the integrity of message sent. A digital signature may be used with both encrypted and non-encrypted messages and does not impede the ability of the receiver of the message to read the message.

For example, assume that DRM process 10 digitally signed 654 license request 608 prior to providing 652 license request 608 to media distribution system 18. When digitally signing 654 license request 608, a mathematical function is typically performed on the content of license request 408. For example, a message hash of license request 608 may be calculated by personal media device 12, such that a message hash is the mathematical output of a known one-way hash function that transforms a string of characters (e.g., license request 608) into a usually shorter fixed-length value that represents the original string of characters. As the hashing function is a one-way mathematical function, once a message hash is generated, the original message cannot be retrieved by processing the message hash. DRM process 10 may then encrypt the message hash (using device private key 400) to create the digital signature (not shown). This digital signature may then be attached to license request 608. Accordingly, while the digital signature is encrypted, the original message (i.e., license request 608) need not be. Therefore, license request 608 may be processed by media distribution system 18 even if the digital signature is not processed.

Continuing with the above-stated example, license request 608 and the digital signature may be received by media distribution system 18, and media distribution system 18 may use the same hash function to generate a message hash of license request 608. Media distribution system 608 will also decrypt the digital signature received from personal media device 12 using device public key 602 (included within device digital certificate 604) to recreate the message hash calculated by personal media device 12. Media distribution system 18 may then compare the decrypted digital signature to the message hash calculated to the media distribution system 608. If the message hashes match, the integrity of license request 608 and the identity of personal media device 12 are both verified 656.

Additionally, the integrity of device digital certificate 604 (and, therefore, device public key 602) may be verified when license request 608 is received from personal media device 12. Digital certificates are typically issued and digitally signed by e.g., certification authority 612 using CA private key 614. Accordingly, device digital certificate 604 may be verified by obtaining the CA public key 616 to verify the digital signature of device digital certificate 604.

Once challenge 606, device digital certificate 604, and user ID 610 (i.e., license request 608) are received by media distribution system 18, media distribution system 18 may access data store 618 to obtain 658 subscription information concerning user 14 (i.e., the user defined within user ID 610) and determine e.g., the date at which the current subscription of user 14 will expire. Data store 618 may be maintained on storage device 34 coupled to computer 28.

Assume, for illustrative purposes, that media distribution system 18 is configured to automatically bill each subscriber on the first of each month for the subscription fee for the upcoming month. Accordingly, on 1 Mar. 2005, user 14 will be billed for the cost of their March 2005 subscription. Therefore, if media distribution system 18 obtains 658 subscription information concerning user 14 on 6 Mar. 2005, the subscription information obtained 658 will indicate that user 14 has a valid subscription until 31 Mar. 2005.

Accordingly and continuing with the above-stated example, when license request 608 is received, media distribution system 18 may obtain 658 subscription information concerning user 14. In this example, the subscription information will indicate that user 14 is a valid subscriber (to media distribution system 18) through 31 Mar. 2005.

Media distribution system 18 may generate 660 a timeout indicator 620, which indicates e.g., the user's subscription information and the expiration date of the user's current subscription. In this example, timeout indicator 620 will indicate e.g., that the subscription of user 14 will expire on 31 Mar. 2005. Media distribution system 18 may obtain user encryption key 622 (i.e., the encryption key for user 14) from data store 618. Media distribution system 18 may then encrypt user encryption key 622, using device public key 602, to generate encrypted user encryption key 622' (shown with a hash fill). Timeout indicator 620, challenge 606, device digital certificate 604 (including device public key 602), user ID 610, and encrypted user encryption key 622' may be combined 662 (by media distribution system 18) to form device license 624.

Device license 618 may further include a system time indicator 626, which indicates the system time as defined by media distribution system 18. System time indicator 626 may be used to synchronize a system clock 194 (FIG. 3) included within personal media device 12 with a system clock 628 included within media distribution system 18.

Device license 624 may further include a licensing service (i.e., LS) digital certificate 630, which typically includes a licensing service (i.e., LS) public key 632.

Media distribution system 18 may digitally sign 664 device license 624 using licensing service (i.e., LS) private key 634 (of media distribution system 18) and provide 666 device license 624 to personal media device 12. Licensing system private key 634 may be stored on data store 618.

When device license 624 is received from media distribution system 18, DRM process 10 may verify the integrity of LS digital certificate 630 (and, therefore, LS public 632). As discussed above, digital certificates are typically issued and digitally signed by e.g., certification authority 612 using CA private key 614. Accordingly, LS digital certificate 630 may be verified by obtaining the CA public key 616 to verify the digital signature of LS digital certificate 630.

DRM process 10 may use LS public key 632 (included within LS digital certificate 630) to verify 468 device license 624 (which was digitally signed using LS private key 634). DRM process 10 may additionally verify challenge value 606, device public key 602, and the device serial number (included within device digital certificate 604) to ensure that device license 624 is intended for personal media device 12. DRM process 10 may then decrypt, with device private key 600, encrypted user encryption key 622' (that was encrypted using device public key 602) to generate user encryption key 622, which may be stored in non-volatile memory, examples of which may include ROM 152 (FIG. 3) and/or storage device 66 (FIG. 3). User ID 610, user encryption key 622, and timeout indicator 620 may be saved on e.g., non-volatile memory, examples of which include ROM 152 (FIG. 3) and/ or storage device 66 (FIG. 3), for use when personal media device 12 renders media content downloaded from media distribution system 18. Additionally, as will be discussed below in greater detail, DRM process 10 may retain a copy of device license 624 for use when transferring media content between personal media device 12 and e.g., personal media device 40.

Obtaining Media Content:

As discussed above, once user 14 subscribes to media distribution system 18, user 14 may obtain from media distribution system 18 media content (for use with personal media device 12) in the form of: purchased downloads received from media distribution system 18 (i.e., media content licensed to e.g., user 14 for use in perpetuity); subscription downloads received from media distribution system 18 (i.e., media content licensed to e.g., user 14 for use while a valid subscription exists with media distribution system 18); and media content streamed from media distribution system 18, for example.

Figure 14A:
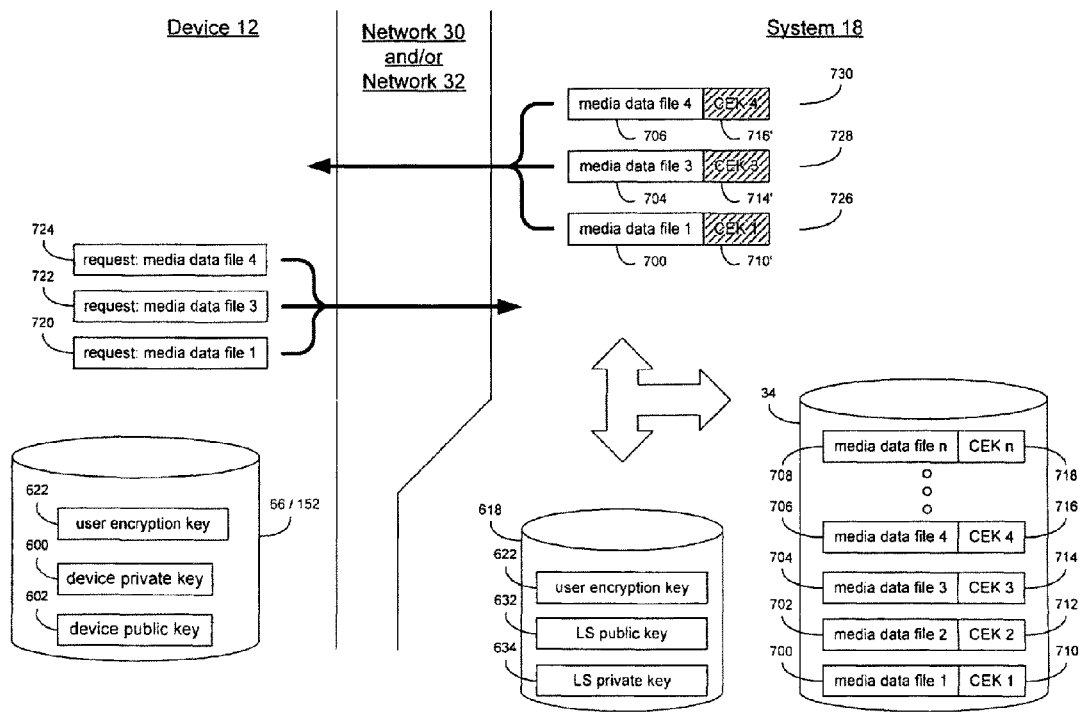
FIG. 14a is a diagrammatic view of the media distribution system, personal media device, and distributed computing network of FIG. 1.
Figure 14B:
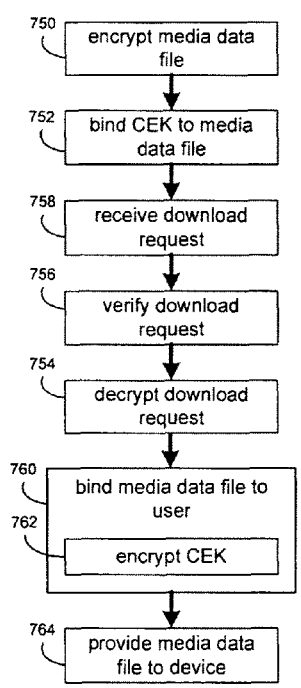
FIG. 14b is a flowchart of a process executed by the DRM process of FIG. 1.

Referring also to FIGS. 14a & 14b, each media data file 700, 702, 704, 706, 708 downloadable from media distribution system 18 may be encrypted 750 using a unique CEK (i.e., content encryption key) 710, 712, 714, 716, 718 respectively. For example, if media distribution system 18 includes 1,000,000 media data files available for downloading to e.g., personal media device 12, media distribution system 18 will encrypt 750 each media data file using a unique encryption key. Accordingly, for 1,000,000 media data files, 1,000,000 unique CEK's will be required, each of which is bound 752 to the media data file to which the CEK is related. Accordingly, CEK 710 is bound 752 to media data file 700, and CEK 712 is bound 752 to media data file 702, for example.

Each CEK (e.g., keys 710, 712, 714, 716, 718) may be a symmetric encryption key, in that the key used to encrypt a media data file may also be used to decrypt the same media data file. Additionally, each media data file may be stored on e.g., storage device 34 attached to computer 28.

As discussed above, search window 404 (FIG. 10) of proxy application 98, may allow user 14 to search for media data files. Additionally, user 14 may download media data files from media distribution system 18 for use on personal media device 12 by selecting the download button 464 (FIG. 11) corresponding to the media data file to be downloaded.

Once the download of a media data file is initiated, personal media device 12 may submit the appropriate download request(s) to media distribution system 18. For example, assume that user 14 wished to download three media data files, namely media data files 700, 704, 706. DRM process 10 would submit download requests 720, 722, 724 respectively, each of which requests the desired file. For security and authentication purposes, download requests 720, 722, 724 may be e.g., encrypted by personal media device 12 (using e.g., LS public key 632) and/or digitally signed by personal media device 12 (using e.g., device private key 600). Accordingly, if a download request is encrypted (using e.g., LS public key 632), the encrypted download request may subsequently be decrypted 754 by media distribution system 18 using LS private key 634. Further, if a download request is digitally signed (using e.g., device private key 600), the signed download request may subsequently be verified 756 by media distribution system 18 using device public key 602.

Once e.g., download requests 720, 722, 724 are received 758 and processed by media distribution system 18, media distribution system 18 may retrieve the requested media data files 700, 704, 706 from e.g., storage device 34. As discussed above, each media data file is currently encrypted using a unique CEK, such that the CEK is bound to the media data file.

Prior to being downloaded to personal media device 12, each media data file to be downloaded is bound 760 to the user (e.g., user 14) who requested the download. As discussed above, during device initialization, personal media device 12 provides license request 608 to media distribution system 18. Media distribution system 18 in turn processes license 608 and obtains current subscription information concerning the user associated with license request 608 (e.g., user 14). As discussed above, this initialization process may occur periodically and, therefore, may occur at the time that personal media device 12 is placed into docking cradle 60 (FIG. 2). Accordingly and for this example, assume that personal media device 12 has provided the required user credentials to properly access media distribution system 18. As discussed above, the user credentials provided to media distribution system 18 may include, but are not limited to, a user name, a user password, a user key, a device name, a device password, a device key, and/or one or more digital certificates.

Once media distribution system 18 retrieves the requested media data files 700, 704, 706 from e.g., storage device 34, media distribution system 18 binds 760 the retrieved media distribution files 700, 704, 706 to user 14 e.g., the user requesting the media data files, thus creating bound media data files 726, 728, 730. Accordingly, the content encryption key (e.g., CEK 710) associated with each media data file (e.g., media data file 700) is encrypted 762 using the encryption key (e.g., user encryption key 722) of the user requesting the media data files (e.g., user 14). Accordingly, CEK 710 is encrypted 762 to generate CEK 710', CEK 714 is encrypted 762 to generate CEK 714', and CEK 716 is encrypted 762 to generate CEK 716'. Once encrypted 762, bound media data files 726, 728, 730 (including encrypted CEK's 710', 714', 716' respectively) are provided 764 to personal media device 12. As the CEK of each bound media data file 726, 728, 730 is encrypted 762 using e.g., user encryption key 622, bound media data files 726, 728, 730 may only be processed (e.g., rendered) by a personal media device in possession of user encryption key 622. As discussed above, a copy of user encryption key 622 is stored on non-volatile memory within personal media device 12. Once bound media data files 726, 728, 730 are received by personal media device, they may be stored on e.g., storage device 66 within personal media device 12.

Media Content Playback:

As discussed above, user ID 610, user encryption key 622, and timeout indicator 620 may be saved for use when personal media device 12 renders media content downloaded from media distribution system 18.

Continuing with the above-stated example, if user 14 wishes to render one of bound media data files 726, 728, 730, user 14 may select the appropriate media data file via the controls (e.g., backward skip switch 78; forward skip switch 80; play/pause switch 82; menu switch 84; radio switch 86; and slider assembly 88, for example) and display panel 90 of personal media device 12. Once one or more media data files are selected for playback, the appropriate file(s) are retrieved from e.g., storage device 66. As discussed above, prior to each media data file being provided to personal media device 12, the CEK of each media data file may be encrypted (by media distribution system 18) using user encryption key 622. As discussed above, user encryption key 622 may be a symmetric encryption key and, therefore, the key used to e.g., encrypt CEK 710 may also be used to decrypt encrypted CEK 710'.

Once the appropriate bound media data files are retrieved from e.g., storage device 66, DRM process 10 may decrypt the appropriate CEK (using user encryption key 622) so that the media data file can be processed and rendered on personal media device 12. For example, if user 14 wished to render bound media data files 726, 728, personal media device 12 would decrypt encrypted CEK 710' to generate CEK 710. CEK 710 may then be used by DRM process 10 to decrypt media data file 700 for playback by personal media device 12. Further, DRM process 10 would decrypt encrypted CEK 714' to generate CEK 714. CEK 714 may then be used by DRM process 10 to decrypt media data file 704 for playback by personal media device 12.

Typically, prior to processing and rendering e.g., bound media data files 726, 728, DRM process 10 will verify that e.g., user 14 has sufficient rights to process and render the bound media data files.

As discussed above, media distribution system 18 is typically a subscription-based service, in that e.g., user 14 subscribes to media distribution system 18 and pays e.g., a monthly subscription fee to be granted access to media distribution system 18. Further, user 14 may obtain from media distribution system 18 subscription downloads that allow user 14 to process and playback the subscription downloads only while a valid subscription exists with media distribution system 18.

Assuming that bound media data files 726, 728, 730 are subscription downloads (as opposed to purchased downloads that are licensed in perpetuity for use by user 14), prior to rendering and/or processing bound media data files 726, 728, 730, DRM process 10 may obtain timeout indicator 620, which as discussed above may be stored on e.g., non-volatile memory, examples of which include ROM 152 (FIG. 3) and/or storage device 66 (FIG. 3). DRM process 10 may then compare the expiration date (e.g., 31 Mar. 2005) defined within timeout indicator 620 to the date and/or time defined within system clock 194 to determine if e.g., user 14 is still allowed to render bound media data files 726, 728, 730. In this example, as user 14 has a valid subscription through 31 Mar. 2005 and the current date and time (as defined by system clock 194) is 17:53 GMT on 6 Mar. 2005, the subscription of user 14 (with respect to media distribution system 18) is valid and current. Accordingly, bound media data files 726, 728, 730 may be processed for playback.

A number of implementations have been described. Nevertheless, it will be understood that various modifications may be made. Accordingly, other implementations are within the scope of the following claims.

What is claimed is:

1. A method for processing metadata within a personal media device comprising:

determining the presence of pre-existing metadata associated with at least one local media content file received at the personal media device from a media distribution system;

determining at least one data field contained within the pre-existing metadata;

generating a homogeneous metadata file for the at least one local media content file by mapping data contained within the at least one data field of the pre-existing metadata into at least one defined data field of the homogeneous metadata file;

generating a unique identifier for the homogeneous metadata file; and adding the unique identifier as metadata to the homogeneous metadata file to associate the homogeneous metadata file with the local media content file on the personal media device.

2. The method of claim 1 further comprising:

parsing at least one data field of the pre-existing metadata; and comparing a label associated with the at least one data field of the preexisting metadata to a label of at least one defined data field of the homogeneous metadata file.

3. The method of claim 2, wherein comparing further comprises:
  determining an exact match between the label associated with the at least one data field of the pre-existing metadata and the label of at least one defined data field of the homogeneous metadata file.

4. The method of claim 2, wherein comparing further comprises:
  determining a match between the label associated with the at least one data field of the pre-existing metadata and the label of at least one defined data field of the homogeneous metadata file based on one or more synonyms of the label associated with the at least one data field of the pre-existing metadata.

5. The method of claim 1, further comprising:
  discarding selected data associated with at least one data field of the preexisting metadata.

6. The method of claim 1, further comprising:
  deleting the pre-existing metadata; and
  removing an association between the pre-existing metadata and the local media content.

7. The method of claim 1, further comprising:
  using at least a portion of the homogeneous metadata file to perform one or more operations chosen from a group including:
    generating a playlist file identifying one or more of the first and second media content files;
    generating a library file identifying one or more of the first and second media content files;
    rendering information indicative of at least a portion of the homogeneous metadata file in a format discernible by a user; and
    providing an indication to a server indicative of the rendering of one or more of the first and second media content files.

8. A storage device having stored thereon instructions that when executed by a machine, cause the machine to perform operations comprising:
  determining the presence of pre-existing metadata associated with at least one local media content file received at the machine from a media distribution system;
  determining at least one data field contained within the preexisting metadata;
  generating a homogeneous metadata file for the at least one local media content file by mapping data contained within the at least one data field of the pre-existing metadata into at least one defined data field of the homogeneous metadata file;
  generating a unique identifier for the homogeneous metadata file; and
  adding the unique identifier as metadata in the homogeneous metadata file to associate the homogeneous metadata file with the local media content file on the machine.

9. The storage device of claim 8, wherein the operations further comprise:
  parsing at least one data field of the pre-existing metadata; and
  comparing a label associated with the at least one data field of the pre-existing metadata to a label of at least one defined data field of the homogeneous metadata file.

10. The storage device of claim 8, wherein the operations further comprise:
  determining an exact match between the label associated with the at least one data field of the pre-existing metadata and the label of at least one defined data field of the homogeneous metadata file.

11. The storage device of claim 8, wherein the operations further comprise:
  determining a match between the label associated with the at least one data field of the pre-existing metadata and the label of at least one defined data field of the homogeneous metadata file based on one or more synonyms of the label associated with the at least one data field of the pre-existing metadata.

12. The storage device of claim 8, wherein the operations further comprise:
  discarding selected data associated with at least one data field of the preexisting metadata.

13. The storage device of claim 8, wherein the instructions for performing operations further comprise:
  deleting the pre-existing metadata; and
  removing an association between the pre-existing metadata and the local media content.

14. The storage device of claim 8, wherein the operations further comprise:
  using at least a portion of the homogeneous metadata file to perform one or more operations chosen from a group including:
    generating a playlist file identifying one or more of the first and second media content files;
    generating a library file identifying one or more of the first and second media content files;
    rendering information indicative of at least a portion of the homogeneous metadata file in a format discernible by a user; and
    providing an indication to a server indicative of the rendering of one or more of the first and second media content files.

15. A client electronic device capable of performing operations comprising:
  determining the presence of pre-existing metadata associated with at least one local media content file received at the client electronic device from a media distribution system;
  determining at least one data field contained within the preexisting metadata;
  generating a homogeneous metadata file for the at least one local media content file by mapping data contained within the at least one data field of the pre-existing metadata into at least one defined data field of the homogeneous metadata file;
  generating a unique identifier for the homogeneous metadata file; and
  linking the homogeneous metadata file to the local media content file, the linking by using the unique identifier.

16. The client electronic device of claim 15, wherein the linking is accomplished by assigning the unique identifier to the homogeneous metadata file.

17. The client electronic device of claim 15, further capable of performing operations comprising:
  parsing at least one data field of the pre-existing metadata; and
  comparing a label associated with the at least one data field of the preexisting metadata to a label of at least one defined data field of the homogeneous metadata file.

18. The client electronic device of claim 17, wherein comparing further comprises:
  determining an exact match between the label associated with the at least one data field of the pre-existing metadata and the label of at least one defined data field of the homogeneous metadata file.

19. The client electronic device of claim 17, wherein comparing further comprises:
   determining a match between the label associated with the at least one data field of the pre-existing metadata and the label of at least one defined data field of the homogeneous metadata file based on one or more synonyms of the label associated with the at least one data field of the pre-existing metadata.

20. The client electronic device of claim 15, further capable of performing operations comprising:
   discarding selected data associated with at least one data field of the pre-existing metadata.

21. The client electronic device of claim 15, further capable of performing operations comprising:
   deleting the pre-existing metadata; and
   removing an association between the pre-existing metadata and the local media content.

\* \* \* \* \*